(12) United States Patent
Ozawa et al.

(10) Patent No.: US 10,497,388 B2
(45) Date of Patent: *Dec. 3, 2019

(54) MAGNETIC TAPE INCLUDING CHARACTERIZED MAGNETIC LAYER

(71) Applicant: FUJIFILM Corporation, Tokyo (JP)

(72) Inventors: Eiki Ozawa, Minami-ashigara (JP); Norihito Kasada, Minami-ashigara (JP); Takuto Kurokawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/624,792

(22) Filed: Jun. 16, 2017

(65) Prior Publication Data

US 2017/0372739 A1    Dec. 28, 2017

(30) Foreign Application Priority Data

Jun. 23, 2016  (JP) .................................. 2016-124525

(51) Int. Cl.
*G11B 5/70* (2006.01)
*G11B 5/78* (2006.01)
(Continued)

(52) U.S. Cl.
CPC .................. *G11B 5/78* (2013.01); *G11B 5/70* (2013.01); *G11B 5/708* (2013.01); *G11B 5/71* (2013.01);
(Continued)

(58) Field of Classification Search
None
See application file for complete search history.

(56) References Cited

U.S. PATENT DOCUMENTS 3,966,686 A    6/1976  Asakura et al.
4,112,187 A    9/1978  Asakura et al.
(Continued)

FOREIGN PATENT DOCUMENTS

DE    101 46 429 A1    3/2002
GB    2495356 A    4/2013
(Continued)

OTHER PUBLICATIONS

An Office Action dated May 4, 2018, which issued during the prosecution of U.S. Appl. No. 15/422,821.
(Continued)

*Primary Examiner* — Kevin M Bernatz
(74) *Attorney, Agent, or Firm* — Sughrue Mion, PLLC

(57) ABSTRACT

A magnetic tape is provided having a total thickness of the non-magnetic and magnetic layers of less than or equal to 0.60 μm. The C—H derived C concentration calculated from the C—H peak area ratio of C1s spectra by ESCA on the surface of the magnetic layer at a photoelectron take-off angle of 10 degrees is greater than or equal to 45 atom %. The full widths at half maximum of spacing distribution measured by optical interferometry regarding the surface of the magnetic layer before and after vacuum heating with respect to the magnetic tape are respectively greater than 0 nm and less than or equal to 7.0 nm, and the difference between a spacing measured after the vacuum heating and a spacing measured before the vacuum heating is greater than 0 nm and less than or equal to 8.0 nm.

19 Claims, 1 Drawing Sheet

(51) Int. Cl.
*G11B 5/71* (2006.01)
*G11B 5/712* (2006.01)
*G11B 5/73* (2006.01)
*G11B 5/708* (2006.01)
*G11B 5/008* (2006.01)

(52) U.S. Cl.
CPC ............ *G11B 5/712* (2013.01); *G11B 5/7305* (2013.01); *G11B 5/00817* (2013.01)

(56) References Cited

U.S. PATENT DOCUMENTS

| | | |
|---|---|---|
| 4,425,404 A | 1/1984 | Suzuki et al. |
| 4,693,930 A | 9/1987 | Kuo et al. |
| 4,746,569 A | 5/1988 | Takahashi et al. |
| 4,825,317 A | 4/1989 | Rausch |
| 5,242,752 A | 9/1993 | Isobe et al. |
| 5,419,938 A | 5/1995 | Kagotani et al. |
| 5,445,881 A | 9/1995 | Irie |
| 5,474,814 A | 12/1995 | Komatsu et al. |
| 5,496,607 A | 3/1996 | Inaba et al. |
| 5,540,957 A | 7/1996 | Ueda et al. |
| 5,585,032 A | 12/1996 | Nakata et al. |
| 5,645,917 A | 7/1997 | Ejiri et al. |
| 5,689,384 A | 11/1997 | Albrecht et al. |
| 5,728,454 A | 3/1998 | Inaba et al. |
| 5,786,074 A | 6/1998 | Soui |
| 5,827,600 A | 10/1998 | Ejiri et al. |
| 6,099,957 A | 8/2000 | Yamamoto et al. |
| 6,183,606 B1 | 2/2001 | Kuo et al. |
| 6,207,252 B1 * | 3/2001 | Shimomura ............ G11B 5/70 428/141 |
| 6,228,461 B1 | 5/2001 | Sueki et al. |
| 6,254,964 B1 | 7/2001 | Saito et al. |
| 6,261,647 B1 | 7/2001 | Komatsu et al. |
| 6,268,043 B1 | 7/2001 | Koizumi et al. |
| 6,496,328 B1 | 12/2002 | Dugas |
| 6,579,826 B2 | 6/2003 | Furuya et al. |
| 6,649,256 B1 | 11/2003 | Buczek et al. |
| 6,686,022 B2 | 2/2004 | Takano et al. |
| 6,770,359 B2 | 8/2004 | Masaki |
| 6,791,803 B2 | 9/2004 | Saito et al. |
| 6,835,461 B1 | 12/2004 | Yamagata et al. |
| 6,921,592 B2 | 7/2005 | Tani et al. |
| 6,939,606 B2 | 9/2005 | Hashimoto et al. |
| 6,950,269 B1 | 9/2005 | Johnson |
| 6,994,925 B2 | 2/2006 | Masaki |
| 7,014,927 B2 | 3/2006 | Sueki et al. |
| 7,029,726 B1 | 4/2006 | Chen et al. |
| 7,153,366 B1 | 12/2006 | Chen et al. |
| 7,255,908 B2 | 8/2007 | Ishikawa et al. |
| 7,511,907 B2 | 3/2009 | Dugas et al. |
| 7,515,383 B2 | 4/2009 | Saito et al. |
| 7,803,471 B1 | 9/2010 | Ota et al. |
| 7,839,599 B2 | 11/2010 | Bui et al. |
| 8,000,057 B2 | 8/2011 | Bui et al. |
| 8,524,108 B2 | 9/2013 | Hattori |
| 8,535,817 B2 * | 9/2013 | Imaoka ............ G11B 5/70 428/844 |
| 8,576,510 B2 | 11/2013 | Cherubini et al. |
| 8,681,451 B2 | 3/2014 | Harasawa et al. |
| 9,105,294 B2 | 8/2015 | Jensen et al. |
| 9,311,946 B2 | 4/2016 | Tanaka et al. |
| 9,465,985 B2 | 10/2016 | Xia et al. |
| 9,530,444 B2 | 12/2016 | Kasada |
| 9,542,967 B2 | 1/2017 | Sekiguchi et al. |
| 9,564,161 B1 | 2/2017 | Cherubini et al. |
| 9,601,146 B2 | 3/2017 | Kasada et al. |
| 9,704,425 B2 | 7/2017 | Zhang et al. |
| 9,704,525 B2 | 7/2017 | Kasada |
| 9,704,527 B2 | 7/2017 | Kasada |
| 9,711,174 B2 | 7/2017 | Kasada et al. |
| 9,721,605 B2 | 8/2017 | Oyanagi et al. |
| 9,721,606 B2 * | 8/2017 | Kasada ............ G11B 5/8404 |
| 9,721,607 B2 | 8/2017 | Tada et al. |
| 9,748,026 B2 | 8/2017 | Shirata |
| 9,773,519 B2 | 9/2017 | Kasada et al. |
| 9,779,772 B1 | 10/2017 | Kasada et al. |
| 9,837,104 B1 | 12/2017 | Biskeborn |
| 9,837,116 B2 * | 12/2017 | Ozawa ............... G11B 5/00813 |
| 9,959,894 B2 | 5/2018 | Omura |
| 9,972,351 B1 | 5/2018 | Kaneko et al. |
| 9,978,414 B1 | 5/2018 | Kaneko et al. |
| 9,984,710 B2 | 5/2018 | Kasada |
| 9,984,712 B1 | 5/2018 | Ozawa |
| 9,984,716 B1 * | 5/2018 | Kaneko .................... G11B 5/70 |
| 10,008,230 B1 | 6/2018 | Ozawa et al. |
| 10,026,430 B2 | 7/2018 | Kasada et al. |
| 10,026,433 B2 | 7/2018 | Kasada et al. |
| 10,026,434 B2 | 7/2018 | Oyanagi et al. |
| 10,026,435 B2 | 7/2018 | Kasada et al. |
| 10,062,403 B1 | 8/2018 | Kasada et al. |
| 10,074,393 B2 | 9/2018 | Kaneko et al. |
| 10,134,433 B2 * | 11/2018 | Kasada .................... G11B 5/70 |
| 10,170,144 B2 * | 1/2019 | Ozawa .................... G11B 5/70 |
| 10,347,279 B2 * | 7/2019 | Ozawa .................... G11B 5/70 |
| 10,347,280 B2 * | 7/2019 | Kasada .................. G11B 5/584 |
| 2001/0038928 A1 | 11/2001 | Nakamigawa et al. |
| 2001/0053458 A1 | 12/2001 | Suzuki et al. |
| 2002/0072472 A1 | 7/2002 | Furuya et al. |
| 2002/0122339 A1 | 9/2002 | Takano et al. |
| 2003/0059649 A1 | 3/2003 | Saliba et al. |
| 2003/0091866 A1 | 5/2003 | Ejiri et al. |
| 2003/0124386 A1 | 7/2003 | Masaki |
| 2003/0170498 A1 | 9/2003 | Inoue |
| 2003/0228493 A1 | 12/2003 | Doushita et al. |
| 2004/0018388 A1 | 1/2004 | Kitamura et al. |
| 2004/0053074 A1 | 3/2004 | Jingu et al. |
| 2004/0072025 A1 | 4/2004 | Kishimoto et al. |
| 2004/0197605 A1 | 10/2004 | Seki et al. |
| 2004/0213948 A1 | 10/2004 | Saito et al. |
| 2004/0218304 A1 | 11/2004 | Goker et al. |
| 2004/0265643 A1 | 12/2004 | Ejiri |
| 2005/0057838 A1 | 3/2005 | Ohtsu |
| 2005/0153170 A1 | 7/2005 | Inoue et al. |
| 2005/0196645 A1 | 9/2005 | Doi et al. |
| 2005/0260456 A1 | 11/2005 | Hanai et al. |
| 2005/0260459 A1 | 11/2005 | Hanai et al. |
| 2005/0264935 A1 | 12/2005 | Sueki et al. |
| 2006/0008681 A1 | 1/2006 | Hashimoto et al. |
| 2006/0035114 A1 | 2/2006 | Kuse et al. |
| 2006/0056095 A1 | 3/2006 | Saitou |
| 2006/0068232 A1 | 3/2006 | Mikamo et al. |
| 2006/0187589 A1 | 8/2006 | Harasawa et al. |
| 2006/0232883 A1 | 10/2006 | Biskeborn et al. |
| 2007/0009769 A1 | 1/2007 | Kanazawa |
| 2007/0020489 A1 | 1/2007 | Yamazaki et al. |
| 2007/0020490 A1 | 1/2007 | Harasawa et al. |
| 2007/0224456 A1 | 9/2007 | Murao et al. |
| 2007/0230054 A1 | 10/2007 | Takeda et al. |
| 2007/0231606 A1 | 10/2007 | Hanai |
| 2008/0057351 A1 | 3/2008 | Meguro et al. |
| 2008/0144211 A1 | 6/2008 | Weber et al. |
| 2008/0152956 A1 | 6/2008 | Murayama et al. |
| 2008/0174897 A1 | 7/2008 | Bates et al. |
| 2008/0297950 A1 | 12/2008 | Noguchi et al. |
| 2008/0311308 A1 | 12/2008 | Lee et al. |
| 2009/0027812 A1 | 1/2009 | Noguchi et al. |
| 2009/0087689 A1 | 4/2009 | Doushita et al. |
| 2009/0161249 A1 | 6/2009 | Takayama et al. |
| 2009/0162701 A1 | 6/2009 | Jensen et al. |
| 2010/0000966 A1 | 1/2010 | Kamata et al. |
| 2010/0035086 A1 | 2/2010 | Inoue et al. |
| 2010/0035088 A1 | 2/2010 | Inoue |
| 2010/0053810 A1 | 3/2010 | Biskeborn et al. |
| 2010/0073816 A1 | 3/2010 | Komori et al. |
| 2010/0081011 A1 | 4/2010 | Nakamura |
| 2010/0134929 A1 | 6/2010 | Ito |
| 2010/0227201 A1 | 9/2010 | Sasaki et al. |
| 2010/0246073 A1 | 9/2010 | Katayama |
| 2011/0003241 A1 | 1/2011 | Kaneko et al. |
| 2011/0051280 A1 | 3/2011 | Karp et al. |
| 2011/0052908 A1 | 3/2011 | Imaoka |
| 2011/0077902 A1 | 3/2011 | Awezec et al. |

(56) References Cited

U.S. PATENT DOCUMENTS

| | | |
|---|---|---|
| 2011/0151281 A1 | 6/2011 | Inoue |
| 2011/0244272 A1 | 10/2011 | Suzuki et al. |
| 2012/0045664 A1* | 2/2012 | Tanaka .................... G11B 5/71 428/840.2 |
| 2012/0152891 A1 | 6/2012 | Brown et al. |
| 2012/0177951 A1 | 7/2012 | Yamazaki et al. |
| 2012/0183811 A1 | 7/2012 | Hattori et al. |
| 2012/0196156 A1 | 8/2012 | Suzuki |
| 2012/0243120 A1 | 9/2012 | Harasawa et al. |
| 2012/0244387 A1 | 9/2012 | Mori et al. |
| 2012/0251845 A1 | 10/2012 | Wang et al. |
| 2013/0029183 A1* | 1/2013 | Omura .................. G11B 5/735 428/844.8 |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1* | 10/2013 | Cideciyan ............ H03M 13/13 360/53 |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1 | 12/2014 | Kikuchi et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1* | 3/2017 | Ozawa .................... G11B 5/70 |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1* | 8/2017 | Oyanagi .................. G11B 5/66 |
| 2017/0221517 A1* | 8/2017 | Ozawa .................... G11B 5/66 |
| 2017/0249963 A1 | 8/2017 | Oyanagi et al. |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1 | 12/2017 | Ozawa et al. |
| 2017/0372740 A1* | 12/2017 | Ozawa .................... G11B 5/78 |
| 2017/0372741 A1* | 12/2017 | Kurokawa ............... G11B 5/78 |
| 2017/0372742 A1 | 12/2017 | Kaneko et al. |
| 2017/0372743 A1 | 12/2017 | Kasada et al. |
| 2017/0372744 A1* | 12/2017 | Ozawa .................... G11B 5/584 |
| 2018/0061446 A1 | 3/2018 | Kasada |
| 2018/0061447 A1 | 3/2018 | Kasada |
| 2018/0082710 A1 | 3/2018 | Tada et al. |
| 2018/0182428 A1 | 4/2018 | Kasada et al. |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182429 A1 | 6/2018 | Kasada et al. |
| 2018/0182430 A1 | 6/2018 | Ozawa et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1* | 8/2018 | Ozawa ............... G11B 5/00813 |
| 2018/0240492 A1 | 8/2018 | Kasada |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1* | 10/2018 | Ozawa .................. G11B 5/3909 |
| 2018/0286442 A1* | 10/2018 | Ozawa ............... G11B 5/70615 |
| 2018/0286443 A1* | 10/2018 | Ozawa ............... G11B 5/70615 |
| 2018/0286444 A1 | 10/2018 | Kasada et al. |
| 2018/0286446 A1* | 10/2018 | Ozawa .................... G11B 5/712 |
| 2018/0286447 A1 | 10/2018 | Ozawa et al. |
| 2018/0286448 A1* | 10/2018 | Ozawa .................... G11B 5/714 |
| 2018/0286449 A1 | 10/2018 | Kasada et al. |
| 2018/0286450 A1 | 10/2018 | Kasada et al. |
| 2018/0286451 A1* | 10/2018 | Ozawa .................... G11B 5/70 |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2018/0374507 A1 | 12/2018 | Kasada |
| 2019/0027167 A1 | 1/2019 | Tada et al. |
| 2019/0027168 A1 | 1/2019 | Kasada et al. |
| 2019/0027171 A1 | 1/2019 | Kasada |
| 2019/0027172 A1 | 1/2019 | Kasada |
| 2019/0027174 A1 | 1/2019 | Tada et al. |
| 2019/0027175 A1 | 1/2019 | Kurokawa et al. |
| 2019/0027176 A1 | 1/2019 | Kurokawa et al. |
| 2019/0027177 A1 | 1/2019 | Kasada |
| 2019/0027178 A1 | 1/2019 | Kasada |
| 2019/0027179 A1* | 1/2019 | Ozawa .................... G11B 5/735 |
| 2019/0027180 A1 | 1/2019 | Kasada et al. |
| 2019/0027181 A1 | 1/2019 | Ozawa et al. |
| 2019/0035424 A1 | 1/2019 | Endo |
| 2019/0051325 A1 | 2/2019 | Kasada et al. |
| 2019/0088278 A1* | 3/2019 | Kasada .................. G11B 5/714 |
| 2019/0096437 A1* | 3/2019 | Ozawa .................... G11B 5/70 |
| 2019/0103130 A1 | 4/2019 | Kasada et al. |
| 2019/0103131 A1 | 4/2019 | Kasada et al. |
| 2019/0103133 A1* | 4/2019 | Ozawa .................... G11B 5/712 |
| 2019/0103134 A1 | 4/2019 | Kasada et al. |
| 2019/0103135 A1 | 4/2019 | Ozawa et al. |
| 2019/0130936 A1 | 5/2019 | Kaneko et al. |
| 2019/0259416 A1 | 8/2019 | Kawakami et al. |
| 2019/0295590 A1 | 9/2019 | Kaneko et al. |

FOREIGN PATENT DOCUMENTS

| | | |
|---|---|---|
| JP | 61-11924 A | 1/1986 |
| JP | 61-139923 A | 6/1986 |
| JP | 61-139932 A | 6/1986 |
| JP | 63-129519 A | 6/1988 |
| JP | 63249932 | 10/1988 |
| JP | 64-57422 A | 3/1989 |

(56) References Cited

FOREIGN PATENT DOCUMENTS

| | | | |
|---|---|---|---|
| JP | 6460819 | A | 3/1989 |
| JP | 5-258283 | A | 10/1993 |
| JP | 5-298653 | A | 11/1993 |
| JP | 7-57242 | A | 3/1995 |
| JP | 11-110743 | A | 4/1999 |
| JP | 11-175949 | A | 7/1999 |
| JP | 11-273051 | A | 10/1999 |
| JP | 2000-251240 | A | 9/2000 |
| JP | 2002-157726 | A | 5/2002 |
| JP | 2002-329605 | A | 11/2002 |
| JP | 2002-367142 | A | 12/2002 |
| JP | 2002-367318 | A | 12/2002 |
| JP | 2003-77116 | A | 3/2003 |
| JP | 2003-323710 | A | 11/2003 |
| JP | 2004-005820 | A | 1/2004 |
| JP | 2004-114492 | A | 4/2004 |
| JP | 2004-133997 | A | 4/2004 |
| JP | 2004-185676 | A | 7/2004 |
| JP | 2005-38579 | A | 2/2005 |
| JP | 2005-092967 | A | 4/2005 |
| JP | 2005-243063 | A | 9/2005 |
| JP | 2005-243162 | A | 9/2005 |
| JP | 2006-92672 | A | 4/2006 |
| JP | 2006-286114 | A | 10/2006 |
| JP | 2007-265555 | A | 10/2007 |
| JP | 2007-273039 | A | 10/2007 |
| JP | 2007-287310 | A | 11/2007 |
| JP | 2007-297427 | A | 11/2007 |
| JP | 2008-047276 | A | 2/2008 |
| JP | 2008-243317 | A | 10/2008 |
| JP | 2009-283082 | A | 12/2009 |
| JP | 2010-036350 | A | 2/2010 |
| JP | 2010-049731 | A | 3/2010 |
| JP | 2011-048878 | A | 3/2011 |
| JP | 2011-138566 | A | 7/2011 |
| JP | 2011-210288 | A | 10/2011 |
| JP | 2011-225417 | A | 11/2011 |
| JP | 2012-038367 | A | 2/2012 |
| JP | 2012-043495 | A | 3/2012 |
| JP | 2012-203955 | A | 10/2012 |
| JP | 2013-25853 | A | 2/2013 |
| JP | 2013-77360 | A | 4/2013 |
| JP | 2013-164889 | A | 8/2013 |
| JP | 2014-15453 | A | 1/2014 |
| JP | 2014-179149 | A | 9/2014 |
| JP | 2015-39801 | A | 3/2015 |
| JP | 2015-111484 | A | 6/2015 |
| JP | 2016-15183 | A | 1/2016 |
| JP | 2016-502224 | A | 1/2016 |
| JP | 2016-051493 | A | 4/2016 |
| JP | 2016-71926 | A | 5/2016 |
| JP | 2016-139451 | A | 8/2016 |

OTHER PUBLICATIONS

An Office Action dated May 4, 2018, which issued during the prosecution of U.S. Appl. No. 15/625,428.
An Office Action dated May 4, 2018, which issued during the prosecution of U.S. Appl. No. 15/422,944.
An Office Action dated May 7, 2018, which issued during the prosecution of U.S. Appl. No. 15/624,897.
An Office Action dated May 7, 2018, which issued during the prosecution of U.S. Appl. No. 15/626,832.
An Office Action dated May 2, 2018, which issued during the prosecution of U.S. Appl. No. 15/280,195.
Notice of Allowance dated Aug. 30, 2017, which issued during the prosecution of U.S. Appl. No. 15/466,143.
Notice of Allowance dated Apr. 27, 2017, which issued during the prosecution of U.S. Appl. No. 15/052,115.
Notice of Allowance dated Jun. 2, 2017, which issued during the prosecution of U.S. Appl. No. 15/218,190.
Communication dated Dec. 6, 2016 from the U.S. Patent and Trademark Office in U.S. Appl. No. 14/757,555.
Communication dated Dec. 5, 2016 from the U.S. Patent and Trademark Office in U.S. Appl. No. 14/978,834.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Aug. 28, 2018, which issued during the prosecution of U.S. Appl. No. 15/422,821.
Notice of Allowance dated Sep. 4, 2018, which issued during the prosecution of U.S. Appl. No. 15/625,428.
Communication dated Aug. 3, 2018 from the U.S. Patent and Trademark Office in U.S. Appl. No. 15/380,336.
Communication dated Aug. 23, 2018 from the U.S. Patent and Trademark Office in U.S. Appl. No. 15/614,876.
Communication dated Aug. 24, 2018 from the U.S. Patent and Trademark Office in U.S. Appl. No. 15/620,916.
Communication dated Aug. 23, 2018 from the U.S. Patent and Trademark Office in U.S. Appl. No. 15/621,464.
Communication dated Aug. 23, 2018 from the U.S. Patent and Trademark Office in U.S. Appl. No. 15/626,720.
U.S. Appl. No. 15/422,821, Pending.
U.S. Appl. No. 15/422,944, Allowed.
U.S. Appl. No. 15/624,897, Allowed; RCE filed Nov. 21, 2018.
U.S. Appl. No. 15/626,832, Allowed; RCE filed Nov. 21, 2018.
U.S. Appl. No. 15/625,428, Allowed Dec. 4, 2018; RCE Filed.
U.S. Appl. No. 15/380,336, Allowed; RCE filed Nov. 21, 2018.
U.S. Appl. No. 15/614,876, Pending.
U.S. Appl. No. 15/620,916, Pending.
U.S. Appl. No. 15/621,464, Pending.
U.S. Appl. No. 15/626,720, Allowed.
U.S. Appl. No. 15/854,383, Pending.
U.S. Appl. No. 15/854,439, Pending.
U.S. Appl. No. 15/848,173, Allowed.
U.S. Appl. No. 15/628,814, Pending.
U.S. Appl. No. 15/626,355, Pending.
U.S. Appl. No. 15/380,309, Pending.
U.S. Appl. No. 15/854,438, Allowed.
U.S. Appl. No. 15/854,409, Allowed.
U.S. Appl. No. 15/920,563, Allowed.
U.S. Appl. No. 15/900,144, Pending.
U.S. Appl. No. 15/900,080, Pending.
U.S. Appl. No. 15/900,230, Pending.
U.S. Appl. No. 15/900,164, Pending.
U.S. Appl. No. 15/899,430, Pending.
U.S. Appl. No. 15/920,515, Pending.
U.S. Appl. No. 15/920,517, Pending.
U.S. Appl. No. 15/920,538, Pending.
U.S. Appl. No. 15/920,544, Pending.
U.S. Appl. No. 15/920,768, Allowed; RCE filed.
U.S. Appl. No. 16/009,603, Quayle Action issued (RCE filed).
U.S. Appl. No. 16/182,083, Pending (Not yet published; continuation of U.S. Appl. No. 15/920,768).
U.S. Appl. No. 16/100,289, Pending.
U.S. Appl. No. 15/900,106, Pending.
Office Action dated Oct. 5, 2017, which issued during the prosecution of U.S. Appl. No. 15/241,286.
Notice of Allowance dated Mar. 21, 2018, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Notice of Allowance dated Mar. 19, 2018, which issued during the prosecution of U.S. Appl. No. 15/378,907.
Notice of Allowance dated Mar. 27, 2018, which issued during the prosecution of U.S. Appl. No. 15/241,631.
Office Action dated Jan. 27, 2015 from the Japanese Patent Office in Japanese Application No. 2013-053543.
Notice of Allowance dated Mar. 14, 2018, which issued during the prosecution of U.S. Appl. No. 15/854,474.

(56) References Cited

OTHER PUBLICATIONS

Office Action dated Sep. 19, 2014, which issued during the prosecution of U.S. Appl. No. 14/209,065.
Office Action dated Mar. 13, 2015, which issued during the prosecution of U.S. Appl. No. 14/209,065.
Office Action dated Jul. 6, 2015, which issued during the prosecution of U.S. Appl. No. 14/209,065.
Office Action dated Sep. 10, 2015, which issued during the prosecution of U.S. Appl. No. 14/209,065.
Office Action dated Mar. 24, 2016, which issued during the prosecution of U.S. Appl. No. 14/209,065.
Notice of Allowance dated Oct. 6, 2016, which issued during the prosecution of U.S. Appl. No. 14/209,065.
Notice of Allowance dated Mar. 21, 2018, which issued during the prosecution of U.S. Appl. No. 15/241,297.
Notice of Allowance dated Jun. 28, 2017, which issued during the prosecution of U.S. Appl. No. 15/464,991.
Office Action dated Nov. 8, 2016 from the Japanese Patent Office in Japanese Application No. 2014-199022.
Office Action dated Feb. 25, 2016, which issued during the prosecution of U.S. Appl. No. 14/867,752.
Office Action dated Oct. 19, 2016, which issued during the prosecution of U.S. Appl. No. 14/867,752.
Office Action dated Mar. 16, 2017, which issued during the prosecution of U.S. Appl. No. 14/867,752.
Office Action dated Sep. 7, 2017, which issued during the prosecution of U.S. Appl. No. 14/867,752.
Office Action dated Jan. 31, 2018, which issued during the prosecution of U.S. Appl. No. 14/867,752.
Notice of Allowance dated Apr. 5, 2018, which issued during the prosecution of U.S. Appl. No. 14/867,752.
Office Action dated Apr. 19, 2018, which issued during the prosecution of U.S. Appl. No. 15/854,438.
Notice of Allowance dated Sep. 24, 2018, which issued during the prosecution of U.S. Appl. No. 15/854,438.
Notice of Allowance dated Jul. 13, 2018, which issued during the prosecution of U.S. Appl. No. 15/920,782.
Notice of Allowance dated Aug. 9, 2018, which issued during the prosecution of U.S. Appl. No. 15/920,563.
Office Action dated Nov. 28, 2018, which issued during the prosecution of U.S. Appl. No. 15/900,144.
Office Action dated Nov. 28, 2018, which issued during the prosecution of U.S. Appl. No. 15/900,080.
Office Action dated Sep. 28, 2018, which issued during the prosecution of U.S. Appl. No. 15/854,409.
Office Action dated Oct. 15, 2018, which issued during the prosecution of U.S. Appl. No. 15/854,403.
Notice of Allowance dated Aug. 6, 2018, which issued during the prosecution of U.S. Appl. No. 15/920,768.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Jul. 3, 2018, which issued during the prosecution of U.S. Appl. No. 15/920,518.
Office Action dated Nov. 28, 2018, which issued during the prosecution of U.S. Appl. No. 15/899,587.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 31, 2018 in U.S. Appl. No. 16/009,603.
U.S. Appl. No. 15/422,944, Allowed; RCE filed Nov. 21, 2018.
U.S. Appl. No. 15/625,428, Allowed Dec. 4, 2018.
U.S. Appl. No. 15/626,720, Pending.
U.S. Appl. No. 15/848,173, Pending.
U.S. Appl. No. 15/378,907, Patented as U.S. No. 9,984,710.
U.S. Appl. No. 15/854,438, Allowed, Issue Fee not yet paid.
U.S. Appl. No. 15/920,563, Petition to Withdraw from Issue and RCE filed on Dec. 17, 2018.
Office Action dated Oct. 3, 2018, which issued during the prosecution of U.S. Appl. No. 15/280,195.
Office Action dated Jul. 6, 2018, which issued during the prosecution of U.S. Appl. No. 15/848,173.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,897.
Notice of Allowance dated Oct. 12, 2018, which issued during the prosecution of U.S. Appl. No. 15/626,832.
Notice of Allowance dated Oct. 11, 2018, which issued during the prosecution of U.S. Appl. No. 15/380,336.
Office Action dated Oct. 15, 2018, which issued during the prosecution of U.S. Appl. No. 15/619,012.
Office Action dated Oct. 9, 2018, which issued during the prosecution of U.S. Appl. No. 15/628,814.
Office Action dated Oct. 22, 2018, which issued during the prosecution of U.S. Appl. No. 15/854,439.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Sep. 27, 2018, which issued during the prosecution of U.S. Appl. No. 15/854,383.
Office Action dated Aug. 3, 2018, which issued during the prosecution of U.S. Appl. No. 15/388,911.
Office Action dated Sep. 26, 2017 issued by the Japanese Patent Office in JP Appln. No. 2014-265723 corresponding to U.S. Appl. No. 14/870,618.
Office Action dated Sep. 26, 2017 issued by the Japanese Patent Office in JP Appln. No. 2015-249264 corresponding to U.S. Appl. No. 14/870,618.
Office Action dated Aug. 10, 2017, which issued during the prosecution of U.S. Appl. No. 14/870,618.
Notice of Allowance dated Feb. 14, 2018, which issued during the prosecution of U.S. Appl. No. 14/870,618.
Notice of Allowance dated Dec. 2, 2016 which issued during the prosecution of U.S. Appl. No. 14/753,227.
Communication dated Nov. 18, 2016 which issued during the prosecution of U.S. Appl. No. 14/753,227.
Office Action dated Aug. 15, 2016 which issued during the prosecution of U.S. Appl. No. 14/753,227.
Office Action dated Feb. 4, 2016 which issued during the prosecution of U.S. Appl. No. 14/753,227.
Notice of Allowance dated Jul. 12, 2017 which issued during the prosecution of U.S. Appl. No. 15/388,864.
Office Action dated Jun. 9, 2017 which issued during the prosecution of U.S. Appl. No. 15/388,864.
Office Action dated Apr. 26, 2017 which issued during the prosecution of U.S. Appl. No. 15/388,864.
Office Action dated Jun. 7, 2018 which issued during the prosecution of U.S. Appl. No. 15/380,309.

(56) References Cited

OTHER PUBLICATIONS

Office Action dated May 30, 2018 which issued during the prosecution of U.S. Appl. No. 15/388,911.
Office Action dated Nov. 16, 2016 which issued during the prosecution of U.S. Appl. No. 15/072,550.
Notice of Allowance dated Apr. 25, 2017 which issued during the prosecution of U.S. Appl. No. 15/072,550.
Notice of Allowance dated May 10, 2018 which issued during the prosecution of U.S. Appl. No. 15/615,871.
Notice of Allowance dated Mar. 16, 2018 which issued during the prosecution of U.S. Appl. No. 15/854,410.
U.S. Appl. No. 15/422,944, Allowed; RED filed Nov. 21, 2018.
U.S. Appl. No. 15/854,438, Allowed; RCE filed.
U.S. Appl. No. 15/920,563, Petition to Withdraw from Issue and RCE filed.
U.S. Appl. No. 15/920,768, QPIDS filed Dec. 10, 2018.
U.S. Appl. No. 16/009,603, Pending.
U.S. Appl. No. 15/625,428, Pending.
U.S. Appl. No. 15/025,115, Patented as U.S. Pat. No. 9,704,527.
U.S. Appl. No. 15/626,353, Pending.
U.S. Appl. No. 15/072,550, Patented as U.S. Pat. No. 9,904,527.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Office Action dated Dec. 20, 2018 in U.S. Appl. No. 15/900,106.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Nov. 14, 2018 in U.S. Appl. No. 16/100,289.
Notice of Allowance dated Apr. 16, 2019 in U.S. Appl. No. 15/625,428.
Notice of Allowance dated Apr. 30, 2019 in U.S. Appl. No. 15/380,309.
Notice of Allowance dated Mar. 13, 2019 in U.S. Appl. No. 16/100,289.
Notice of Allowance dated Mar. 18, 2019 in U.S. Appl. No. 15/626,355.
Notice of Allowance dated Mar. 18, 2019 in U.S. Appl. No. 15/628,814.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Apr. 4, 2019 in U.S. Appl. No. 16/184,312.
Office Action dated Feb. 5, 2019 in U.S. Appl. No. 16/038,339.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
"Introduction to TMR Magnetic Sensors", Anonymous, Mar. 12, 2015, MR Sensor Technology, pp. 1-4 (Year: 2015).
Notice of Allowance dated Mar. 5, 2019 in U.S. Appl. No. 16/009,603.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,897.
Office Action dated Feb. 26, 2019 in U.S. Appl. No. 15/626,832.
Office Action dated Feb. 28, 2019 in U.S. Appl. No. 15/920,518.
Office Action dated Mar. 5, 2019 in U.S. Appl. No. 15/443,026.
Office Action dated Mar. 6, 2019 in U.S. Appl. No. 15/854,403.
Office Action dated Mar. 7, 2019 in U.S. Appl. No. 15/854,439.
Office Action dated Dec. 19, 2018 in U.S. Appl. No. 15/900,345.
Office Action dated Dec. 19, 2018 in U.S. Appl. No. 15/900,379.
Office Action dated Dec. 21, 2018 in U.S. Appl. No. 15/900,160.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 7, 2019 in U.S. Appl. No. 15/621,464.
Office Action dated Nov. 19, 2018 in U.S. Appl. No. 15/900,141.
Office Action dated Feb. 21, 2019 in U.S. Appl. No. 15/854,383.
Office Action dated Dec. 21, 2018 in U.S. Appl. No. 15/920,616.
Office Action dated Dec. 20, 2018 in U.S. Appl. No. 15/900,242.
Office Action datedDec. 27, 2018 in U.S. Appl. No. 15/900,334.
Office Action dated Dec. 7, 2019 in U.S. Appl. No. 15/920,592.
Notice of Allowance dated Aug. 27, 2018 in U.S. Appl. No. 15/920,635.
U.S. Appl. No. 15/280,195, Pending.
U.S. Appl. No. 15/422,821, Allowed.
U.S. Appl. No. 15/619,012, Pending.
U.S. Appl. No. 15/624,897, Pending.
U.S. Appl. No. 15/626,832, Pending.
U.S. Appl. No. 15/625,428, Allowed.
U.S. Appl. No. 15/380,336, Pending.
U.S. Appl. No. 15/614,876, Allowed.
U.S. Appl. No. 15/621,464, Allowed.
U.S. Appl. No. 15/854,383, Allowed.
U.S. Appl. No. 15/848,173, Allowed; QPIDS filed.
U.S. Appl. No. 15/628,814, Allowed; RCE filed.
U.S. Appl. No. 15/690,400, Pending.
U.S. Appl. No. 15/690,906, Pending.
U.S. Appl. No. 15/626,355, Allowed; RCE filed.
U.S. Appl. No. 15/627,696, Pending.
U.S. Appl. No. 15/388,911, Pending.
U.S. Appl. No. 15/380,309, Allowed.
U.S. Appl. No. 15/241,286, Patented as U.S. Pat. No. 10,026,4331.
U.S. Appl. No. 15/854,438, Allowed; QPIDS filed.
U.S. Appl. No. 15/854,409, Allowed; QPIDS filed.
U.S. Appl. No. 15/920,563, Allowed; QPIDS filed.
U.S. Appl. No. 15/920,533, Pending.
U.S. Appl. No. 15/900,230, Allowed.
U.S. Appl. No. 15/900,164, Allowed.
U.S. Appl. No. 15/920,518, Pending.

(56) References Cited

OTHER PUBLICATIONS

U.S. Appl. No. 15/899,430, Allowed.
U.S. Appl. No. 15/920,515, Allowed.
U.S. Appl. No. 15/920,517, Allowed.
U.S. Appl. No. 15/920,538, Allowed.
U.S. Appl. No. 15/920,544, Allowed.
U.S. Appl. No. 15/920,768, Allowed; QPIDS filed.
U.S. Appl. No. 16/009,603, Allowed.
U.S. Appl. No. 16/182,083, Pending (Continuation of U.S. Appl. No. 15/920,768).
U.S. Appl. No. 16/232,165, Pending (Continuation of U.S. Appl. No. 15/854,438).
U.S. Appl. No. 16/100,289, Allowed; RCE filed.
U.S. Appl. No. 15/900,106, Allowed.
U.S. Appl. No. 15/900,160, Allowed.
U.S. Appl. No. 15/900,345, Allowed.
U.S. Appl. No. 15/900,379, Allowed.
U.S. Appl. No. 15/920,616, Allowed.
U.S. Appl. No. 15/900,334, Allowed.
U.S. Appl. No. 15/920,592, Allowed.
U.S. Appl. No. 16/038,339, Allowed.
U.S. Appl. No. 16/044,574, Allowed.
Notice of Allowance dated Jul. 16, 2019 in U.S. Appl. No. 15/900,144.
Notice of Allowance dated Jun. 25, 2019 in U.S. Appl. No. 15/620,916.
Notice of Allowance dated Jun. 27, 2019 in U.S. Appl. No. 15/854,439.
Notice of Allowance dated Jun. 6, 2019 in U.S. Appl. No. 15/854,383.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Jun. 10, 2019 in U.S. Appl. No. 15/920,518.
Office Action dated Jun. 25, 2019 in Japanese Application No. 2015-245144.
Office Action dated Jun. 6, 2019 in U.S. Appl. No. 15/899,587.
Office Action dated May 23, 2019 in U.S. Appl. No. 15/388,911.
Office Action dated Jul. 16, 2019 in Japanese Application No. 2016-124933.
U.S. Appl. No. 15/052,115, Patented as U.S. Pat. No. 9,704,527.
U.S. Appl. No. 15/218,190, Patented as U.S. Pat. No. 9,721,606.
U.S. Appl. No. 15/280,195, Allowed.
U.S. Appl. No. 15/422,821, Allowed; QPIDS filed.
U.S. Appl. No. 15/422,944, Patented as U.S. Pat. No. 10,347,279.
U.S. Appl. No. 15/466,143, Patented as U.S. Pat. No. 9,837,116.
U.S. Appl. No. 15/619,012, Allowed.
U.S. Appl. No. 15/624,897, Allowed.
U.S. Appl. No. 15/626,832, Allowed.
U.S. Appl. No. 15/625,428, Patented as U.S. Pat. No. 10,403,318.
U.S. Appl. No. 14/978,834, Patented as U.S. Pat. No. 9,721,605.
U.S. Appl. No. 14/757,555, Patented as U.S. Pat. No. 9,711,174.
U.S. Appl. No. 15/197,046, Patented as U.S. Pat. No. 9,721,607.
U.S. Appl. No. 15/380,336, Allowed.
U.S. Appl. No. 15/614,876, Patented as U.S. Pat. No. 10,431,248.
U.S. Appl. No. 15/620,916, Allowed.
U.S. Appl. No. 15/621,464, Patented as U.S. Pat. No. 10,431,249.
U.S. Appl. No. 15/626,720, Patented as U.S. Pat. No. 10,347,280.
U.S. Appl. No. 15/854,383, Patented as U.S. Pat. No. 10,438,628.
U.S. Appl. No. 15/854,507, Patented as U.S. Pat. No. 9,984,716.
U.S. Appl. No. 15/854,439, Allowed.
U.S. Appl. No. 15/854,506, Patented as U.S. Pat. No. 10,008,230.
U.S. Appl. No. 15/848,173, Patented as U.S. Pat. No. 10,403,320.
U.S. Appl. No. 15/628,814, Allowed.
U.S. Appl. No. 15/690,400, Allowed.
U.S. Appl. No. 15/690,906, Allowed.
U.S. Appl. No. 15/626,355, Allowed.
U.S. Appl. No. 15/627,696, Allowed.
U.S. Appl. No. 14/870,618, Patented as U.S. Pat. No. 9,959,894.
U.S. Appl. No. 15/388,911, Allowed.
U.S. Appl. No. 14/753,227, Patented as U.S. Pat. No. 9,601,146.
U.S. Appl. No. 15/380,309, Patented as U.S. Pat. No. 10,403,319.
U.S. Appl. No. 15/388,864, Patented as U.S. Pat. No. 9,773,519.
U.S. Appl. No. 15/072,550, Patented as U.S. Pat. No. 9,704,525.
U.S. Appl. No. 15/615,871, Patented as U.S. Pat. No. 10,074,393.
U.S. Appl. No. 15/854,410, Patented as U.S. Pat. No. 9,972,351.
U.S. Appl. No. 15/378,907, Patented as U.S. Pat. No. 9,984,710.
U.S. Appl. No. 15/241,631, Patented as U.S. Pat. No. 10,026,435.
U.S. Appl. No. 14/209,065, Patented as U.S. Pat. No. 9,530,444.
U.S. Appl. No. 15/854,474, Patented as U.S. Pat. No. 9,978,414.
U.S. Appl. No. 15/854,403, Pending.
U.S. Appl. No. 15/241,297, Patented as U.S. Pat. No. 10,026,434.
U.S. Appl. No. 15/241,286, Patented as U.S. Pat. No. 10,026,433.
U.S. Appl. No. 15/464,991, Patented as U.S. Pat. No. 9,779,772.
U.S. Appl. No. 14/867,752, Patented as U.S. Pat. No. 10,026,430.
U.S. Appl. No. 15/854,438, Patented as U.S. Pat. No. 10,373,633.
U.S. Appl. No. 15/854,409, Pending.
U.S. Appl. No. 15/443,026, Pending.
U.S. Appl. No. 15/920,782, Patented as U.S. Pat. No. 10,134,433.
U.S. Appl. No. 15/920,563, Patented as U.S. Pat. No. 10,360,937.
U.S. Appl. No. 15/920,533, Patented as U.S. Pat. No. 10,431,251.
U.S. Appl. No. 15/900,144, Allowed.
U.S. Appl. No. 15/900,080, Allowed.
U.S. Appl. No. 15/900,230, Patented as U.S. Pat. No. 10,431,250.
U.S. Appl. No. 15/900,164, Patented as U.S. Pat. No. 10,424,330.
U.S. Appl. No. 15/920,518, Allowed.
U.S. Appl. No. 15/899,587, Pending.
U.S. Appl. No. 15/899,430, Patented as U.S. Pat. No. 10,403,314.
U.S. Appl. No. 15/920,515, Patented as U.S. Pat. No. 10,410,665.
U.S. Appl. No. 15/920,517, Patented as U.S. Pat. No. 10,395,685.
U.S. Appl. No. 15/920,538, Patented as U.S. Pat. No. 10,403,317.
U.S. Appl. No. 15/920,544, Patented as U.S. Pat. No. 10,410,666.
U.S. Appl. No. 15/920,768, Patented as U.S. Pat. No. 10,373,639.
U.S. Appl. No. 16/009,603, Patented as U.S. Pat. No. 10,366,721.
U.S. Appl. No. 16/182,083, Allowed (Continuation of U.S. Appl. No. 15/920,768).
U.S. Appl. No. 15/705,531, Pending.
U.S. Appl. No. 16/232,165, Allowed (Continuation of U.S. Appl. No. 15/854,438).
U.S. Appl. No. 16/100,289, Allowed.
U.S. Appl. No. 16/038,669, Pending.
U.S. Appl. No. 15/900,106, Patented as U.S. Pat. No. 10,438,624.
U.S. Appl. No. 15/900,412, Patented as U.S. Pat. No. 10,062,4032.
U.S. Appl. No. 15/900,141, Allowed.
U.S. Appl. No. 15/900,160, Patented as U.S. Pat. No. 10,438,625.
U.S. Appl. No. 15/900,345, Allowed; QPIDS filed.
U.S. Appl. No. 15/900,379, Allowed; QPIDS filed.
U.S. Appl. No. 16/012,018, Pending.
U.S. Appl. No. 15/920,616, Patented as U.S. Pat. No. 10,438,623.
U.S. Appl. No. 15/900,242, Allowed.
U.S. Appl. No. 15/900,334, Patented as U.S. Pat. No. 10,438,621.
U.S. Appl. No. 15/920,592, Patented as U.S. Pat. No. 10,403,312.
U.S. Appl. No. 15/920,635, Patented as U.S. Pat. No. 10,170,144.
U.S. Appl. No. 16/160,377, Allowed.
U.S. Appl. No. 15/443,094, Pending.
U.S. Appl. No. 15/442,961, Pending.
U.S. Appl. No. 16/038,687, Pending.
U.S. Appl. No. 16/038,514, Pending.
U.S. Appl. No. 16/038,545, Pending.
U.S. Appl. No. 16/037,596, Pending.
U.S. Appl. No. 16/038,771, Pending.
U.S. Appl. No. 16/037,564, Pending.
U.S. Appl. No. 16/038,339, Patented as U.S. Pat. No. 10,403,316.
U.S. Appl. No. 16/037,573, Pending.
U.S. Appl. No. 16/037,681, Pending.
U.S. Appl. No. 16/038,884, Pending.

(56) References Cited

OTHER PUBLICATIONS

U.S. Appl. No. 16/038,847, Pending.
U.S. Appl. No. 16/044,574, Patented as U.S. Pat. No. 10,438,622.
U.S. Appl. No. 16/142,560, Pending.
U.S. Appl. No. 16/184,312, Allowed.
U.S. Appl. No. 16/143,646, Allowed.
U.S. Appl. No. 16/144,428, Pending.
U.S. Appl. No. 16/143,747, Pending.
U.S. Appl. No. 16/440,161, Pending.
U.S. Appl. No. 16/144,605, Pending.
U.S. Appl. No. 15/854,397, Pending.
U.S. Appl. No. 15/854,329, Patented as U.S. Pat. No. 9,984,712.
U.S. Appl. No. 14/838,663, Abandoned.
Notice of Allowance dated Jul. 31, 2019 in U.S. Appl. No. 16/100,289.
Notice of Allowance dated Jul. 31, 2019 in U.S. Appl. No. 16/143,646.
Office Action dated Aug. 27, 2019 in Japanese Application No. 2016-254428.
Office Action dated Aug. 27, 2019 in Japanese Application No. 2016-254430.
Office Action dated Aug. 27, 2019 in Japanese Application No. 2016-254432.
Office Action dated Aug. 28, 2019 in U.S. Appl. No. 15/854,397.
Office Action dated Aug. 6, 2019 in Japanese Application No. 2016-254421.
Office Action dated Aug. 6, 2019 in Japanese Application No. 2016-254427.
Office Action dated Oct. 10, 2019 in U.S. Appl. No. 15/705,531.
Office Action dated Oct. 9, 2019 in U.S. Appl. No. 16/440,161.
Office Action dated Sep. 17, 2019 in Japanese Application No. 2017-029499.
Office Action dated Sep. 3, 2019 in Japanese Application No. 2016-254434.
Notice of Allowance dated Oct. 17, 2019 in U.S. Appl. No. 15/388,911.

* cited by examiner

MAGNETIC TAPE INCLUDING CHARACTERIZED MAGNETIC LAYER

CROSS-REFERENCE TO RELATED APPLICATIONS

This application claims priority under 35 U.S.C 119 to Japanese Patent Application No. 2016-124525 filed on Jun. 23, 2016. The above application is hereby expressly incorporated by reference, in its entirety.

BACKGROUND OF THE INVENTION

1. Field of the Invention

The present invention relates to a magnetic tape.

2. Description of the Related Art

Magnetic recording media are divided into tape-shaped magnetic recording media and disk-shaped magnetic recording media, and tape-shaped magnetic recording media, that is, magnetic tapes are mainly used for storage such as data back-up. The recording and reproducing of signals to the magnetic tape are normally performed by allowing the magnetic tape to run in a drive and bringing the surface of the magnetic layer of the magnetic tape to come into contact with a magnetic head (hereinafter, also simply referred to as a "head") to slide thereon.

When the running of the magnetic tape is repeated in a state of a high coefficient of friction between the surface of the magnetic layer and the head at the time of sliding, a phenomenon in which running stability is deteriorated due to sticking between the surface of the magnetic layer and the head (hereinafter, also simply referred to as "sticking") may occur. In order to prevent the occurrence of such a phenomenon, JP2012-43495A, for example, proposes a technology of controlling a presence state of a lubricant on the surface of the magnetic layer.

SUMMARY OF THE INVENTION

The recording and reproduction of information with respect to a magnetic tape are performed while running the magnetic tape in a drive. A running speed at the time of the running is normally controlled by a control unit of the drive so as to be a set speed. However, in practice, the running speed of the magnetic tape in the drive is not directly set as a set speed from the start of the running, and is set to be lower than the set value, for a period of accelerating to the set speed in the initial stage of the running or for a period of decelerating in order to stop the running. That is, the period in which the magnetic tape runs in the drive includes an acceleration period or a deceleration period in which the magnetic tape runs at a speed lower than the set speed, and a period during which the magnetic tape runs at the set speed (that is, a period in which the magnetic tape runs at a speed higher than the speed in the acceleration period or the deceleration period). In order to improve the running stability of the magnetic tape in the drive, it is necessary that sticking between a surface of a magnetic layer and a head is prevented in both of the periods described above.

Meanwhile, the magnetic tape is normally used to be accommodated and circulated in a magnetic tape cartridge. In order to increase the recording capacity for 1 reel of the magnetic tape cartridge, it is desired to increase the total length of the magnetic tape accommodated in 1 reel of the magnetic tape cartridge. In order to increase the recording capacity, it is necessary that the magnetic tape is thinned (hereinafter, referred to as "thinning"). As one method of thinning the magnetic tape, a method of decreasing the total thickness of a non-magnetic layer and a magnetic layer of a magnetic tape including the non-magnetic layer and the magnetic layer on a non-magnetic support in this order is used.

In consideration of these circumstances, the inventors have studied the running stability of a magnetic tape having a decreased total thickness of a non-magnetic layer and a magnetic layer. However, in such studies, it was clear that a phenomenon, which was not known in the related art, occurred in which the running stability is deteriorated due to significant occurrence of sticking at least in any of the periods, in a magnetic tape having a decreased total thickness of a non-magnetic layer and a magnetic layer which is equal to or smaller than 0.60 µm, compared to a magnetic tape having the total thickness of a non-magnetic layer and a magnetic layer which exceeds 0.60 µm.

Therefore, an object of the invention is to provide a magnetic tape having the total thickness of a non-magnetic layer and a magnetic layer equal to or smaller than 0.60 µm and having excellent running stability.

According to one aspect of the invention, there is provided a magnetic tape comprising: a non-magnetic support; a non-magnetic layer including non-magnetic powder and a binder on the non-magnetic support; and a magnetic layer including ferromagnetic powder and a binder on the non-magnetic layer, in which the total thickness of the non-magnetic layer and the magnetic layer is equal to or smaller than 0.60 µm, the magnetic layer includes one or more components selected from the group consisting of fatty acid and fatty acid amide, and fatty acid ester, a C—H derived C concentration (hereinafter, also referred to as a "surface part C—H derived C concentration") calculated from a C—H peak area ratio of C1s spectra obtained by X-ray photoelectron spectroscopic analysis performed on the surface of the magnetic layer at a photoelectron take-off angle of 10 degrees is equal to or greater than 45 atom %, a full width at half maximum of spacing distribution measured by optical interferometry regarding the surface of the magnetic layer before performing a vacuum heating with respect to the magnetic tape (hereinafter, also referred to as "$FWHM_{before}$") is greater than 0 nm and equal to or smaller than 7.0 nm, a full width at half maximum of spacing distribution measured by optical interferometry regarding the surface of the magnetic layer after performing the vacuum heating with respect to the magnetic tape (hereinafter, also referred to as "$FWHM_{after}$") is greater than 0 nm and equal to or smaller than 7.0 nm, and a difference ($S_{after}-S_{before}$) between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape (hereinafter, also simply referred to as a "difference ($S_{after}-S_{before}$)") is greater than 0 nm and equal to or smaller than 8.0 nm.

In regards to the surface part C—H derived C concentration, the X-ray photoelectron spectroscopic analysis performed for acquiring the surface part C—H derived C concentration is an analysis method also generally known as Electron Spectroscopy for Chemical Analysis (ESCA) or X-ray Photoelectron Spectroscopy (XPS). Hereinafter, the X-ray photoelectron spectroscopic analysis will be also referred to as ESCA. The ESCA is an analysis method using a phenomenon of photoelectron emission when a surface of a measurement target sample is irradiated with X ray, and is widely used as an analysis method regarding a surface part of a measurement target sample. According to the ESCA, it is possible to perform a qualitative analysis and quantitative analysis by using X-ray photoemission spectra acquired by the analysis regarding the sample surface of the measurement target. A depth from the sample surface to the analysis position (hereinafter, also referred to as "detection depth") and photoelectron take-off angle generally satisfy the following expression: detection depth mean free path of electrons×3×sin θ. In the expression, the detection depth is a depth where 95% of photoelectrons configuring X-ray photoemission spectra are generated, and θ is the photoelectron take-off angle. From the expression described above, it is found that, as the photoelectron take-off angle decreases, the analysis regarding a shallow part of the depth from the sample surface can be performed, and as the photoelectron take-off angle increases, the analysis regarding a deep part of the depth from the sample surface can be performed. In the analysis performed by the ESCA at a photoelectron take-off angle of 10 degrees, an extreme outermost surface part having a depth of approximately several nm from the sample surface generally becomes an analysis position. Accordingly, in the surface of the magnetic layer of the magnetic tape, according to the analysis performed by the ESCA at a photoelectron take-off angle of 10 degrees, it is possible to perform a composition analysis regarding the extreme outermost surface part having a depth of approximately several nm from the surface of the magnetic layer. In the invention and the specification, the "surface of the magnetic layer" is identical to the surface of the magnetic tape on the magnetic layer side.

The C—H derived C concentration is a percentage of carbon atoms C configuring the C—H bond occupying total (based on atom) 100 atom % of all elements detected by the qualitative analysis performed by the ESCA. The magnetic tape includes one or more components selected from the group consisting of fatty acid and fatty acid amide at least in the magnetic layer. Fatty acid and fatty acid amide are components which can function as lubricants in the magnetic tape. The inventors have considered that, on the surface of the magnetic layer of the magnetic tape including one or more of these components at least in the magnetic layer, the C—H derived C concentration obtained by the analysis performed by the ESCA at a photoelectron take-off angle of 10 degrees becomes an index of the presence amount of the components (one or more components selected from the group consisting of fatty acid and fatty acid amide) in the extreme outermost surface part of the magnetic layer. Specific description is as follows.

In X-ray photoemission spectra (horizontal axis: bonding energy, vertical axis: strength) obtained by the analysis performed by the ESCA, the C1s spectra include information regarding an energy peak of a 1s orbit of the carbon atoms C. In such C1s spectra, a peak positioned at the vicinity of the bonding energy 284.6 eV is a C—H peak. This C—H peak is a peak derived from the bonding energy of the C—H bond of the organic compound. The inventors have surmised that, in the extreme outermost surface part of the magnetic layer including one or more components selected from the group consisting of fatty acid and fatty acid amide, main constituent components of the C—H peak are components selected from the group consisting of fatty acid and fatty acid amide. Accordingly, the inventors have considered that the C—H derived C concentration can be used as an index of the presence amount as described above. The surface part C—H derived C concentration will be described later more specifically.

Meanwhile, in regards to "$FWHM_{before}$", "$FWHM_{after}$", and "difference ($S_{after}-S_{before}$)", in the invention and the specification, the "vacuum heating" of the magnetic tape is performed by holding the magnetic tape in an environment of a pressure of 200 Pa to 0.01 MPa and at an atmosphere temperature of 70° C. to 90° C. for 24 hours.

In the invention and the specification, the spacing measured by optical interferometry regarding the surface of the magnetic layer of the magnetic tape is a value measured by the following method.

In a state where the magnetic tape and a transparent plate-shaped member (for example, glass plate or the like) are overlapped on each other so that the surface of the magnetic layer of the magnetic tape faces the transparent plate-shaped member, a pressing member is pressed against the side of the magnetic tape opposite to the magnetic layer side at pressure of $5.05\times10^4$ N/m (0.5 atm). In this state, the surface of the magnetic layer of the magnetic tape is irradiated with light through the transparent plate-shaped member (irradiation region: 150,000 to 200,000 $\mu m^2$), and a spacing (distance) between the surface of the magnetic layer of the magnetic tape and the surface of the transparent plate-shaped member is acquired based on intensity (for example, contrast of interference fringe image) of interference light generated due to a difference in an optical path between reflected light from the surface of the magnetic layer of the magnetic tape and reflected light from the surface of the transparent plate-shaped member on the magnetic tape side. The light emitted here is not particularly limited. In a case where the emitted light is light having an emission wavelength over a comparatively wide wavelength range as white light including light having a plurality of wavelengths, a member having a function of selectively cutting light having a specific wavelength or a wavelength other than wavelengths in a specific wavelength range, such as an interference filter, is disposed between the transparent plate-shaped member and a light reception unit which receives reflected light, and light at some wavelengths or some wavelength ranges of the reflected light is selectively incident to the light reception unit. In a case where the light emitted is light (so-called monochromatic light) having a single luminescence peak, the member described above may not be used. The wavelength of light incident to the light reception unit can be set to be in a range of 500 to 700 nm, for example. However, the wavelength of light incident to the light reception unit is not limited to be in the range described above. In addition, the transparent plate-shaped member may be a member having transparency with which light emitted passes, to the extent that the magnetic tape is irradiated with light through this member and interference light is obtained.

The measurement described above can be performed by using a commercially available tape spacing analyzer (TSA) such as Tape Spacing Analyzer manufactured by Micro-Physics, Inc., for example. The spacing measurement of Examples was performed by using Tape Spacing Analyzer manufactured by MicroPhysics, Inc.

In addition, the full width at half maximum of spacing distribution of the invention and the specification is a full width at half maximum (FWHM), when the interference fringe image obtained by the measurement of the spacing described above is divided into 300,000 points, a spacing of each point (distance between the surface of the magnetic layer of the magnetic tape and the surface of the transparent plate-shaped member on the magnetic tape side) is acquired, this spacing is shown with a histogram, and this histogram is fit with Gaussian distribution.

Further, the difference ($S_{after}-S_{before}$) is a value obtained by subtracting a mode before the vacuum heating from a mode after the vacuum heating of the 300,000 points.

"FWHM$_{before}$", "FWHM$_{after}$", and "difference ($S_{after}-S_{before}$)" will be described later more specifically.

In one aspect, the surface part C—H derived C concentration is in a range of 45 to 80 atom %.

In one aspect, the surface part C—H derived C concentration is in a range of 60 to 80 atom %.

In one aspect, the difference ($S_{after}-S_{before}$) is greater than 0 nm and equal to or smaller than 7.0 nm.

In one aspect, the difference ($S_{after}-S_{before}$) is 2.0 nm to 7.0 nm.

In one aspect, the FWHM$_{before}$ is greater than 0 nm and equal to or smaller than 5.0 nm.

In one aspect, the FWHM$_{after}$ is greater than 0 nm and equal to or smaller than 5.0 nm.

In one aspect, the total thickness of the non-magnetic layer and the magnetic layer is 0.20 μm to 0.60 μm.

In one aspect, the magnetic layer includes a non-magnetic filler. The non-magnetic filler is identical to the non-magnetic powder. In the invention and the specification, the non-magnetic powder means an aggregate of a plurality of non-magnetic particles. The aggregate not only includes an aspect in which particles configuring the aggregate directly come into contact with each other, but also includes an aspect in which a binder and an additive is interposed between the particles. A term "particles" is also used for describing the powder. The same applies to various powder forms of the invention and the specification such as the ferromagnetic powder and the like.

In one aspect, the non-magnetic filler is colloidal particles. In the invention and the specification, the "colloidal particles" are particles which are not precipitated and dispersed to generate a colloidal dispersion, when 1 g of the particles are added to 100 mL of at least one organic solvent of at least methyl ethyl ketone, cyclohexanone, toluene, or ethyl acetate, or a mixed solvent including two or more kinds of the solvents described above at an arbitrary mixing ratio.

In one aspect, the colloidal particles are silica colloidal particles.

According to one aspect of the invention, it is possible to provide a magnetic tape having the total thickness of a non-magnetic layer and a magnetic layer equal to or smaller than 0.60 μm and having excellent running stability.

DESCRIPTION OF THE PREFERRED EMBODIMENTS

Figure 1:
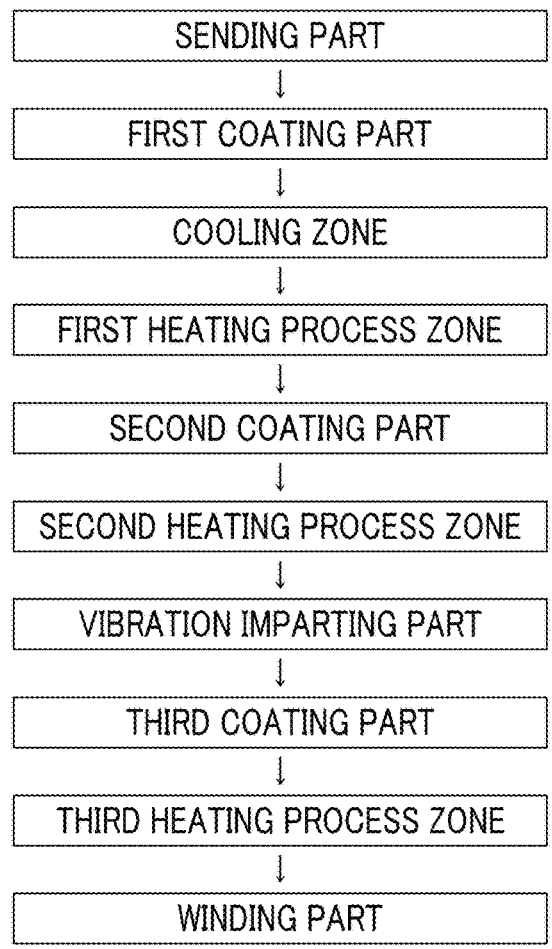
FIG. 1 shows an example (step schematic view) of a specific aspect of a magnetic tape manufacturing step.

According to one aspect of the invention, there is provided a magnetic tape including: a non-magnetic support; a non-magnetic layer including non-magnetic powder and a binder on the non-magnetic support; and a magnetic layer including ferromagnetic powder and a binder on the non-magnetic layer, in which the total thickness of the non-magnetic layer and the magnetic layer is equal to or smaller than 0.60 μm, the magnetic layer includes one or more components selected from the group consisting of fatty acid and fatty acid amide, and fatty acid ester, a C—H derived C concentration (surface part C—H derived C concentration) calculated from a C—H peak area ratio of C1s spectra obtained by X-ray photoelectron spectroscopic analysis performed on the surface of the magnetic layer at a photoelectron take-off angle of 10 degrees is equal to or greater than 45 atom %, a full width at half maximum (FWHM$_{before}$) of spacing distribution measured by optical interferometry regarding the surface of the magnetic layer before performing vacuum heating with respect to the magnetic tape is greater than 0 nm and equal to or smaller than 7.0 nm, a full width at half maximum (FWHM$_{after}$) of spacing distribution measured by optical interferometry regarding the surface of the magnetic layer after performing the vacuum heating with respect to the magnetic tape is greater than 0 nm and equal to or smaller than 7.0 nm, and a difference ($S_{after}-S_{before}$) between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape is greater than 0 nm and equal to or smaller than 8.0 nm.

In the magnetic tape, the surface part C—H derived C concentration, the FWHM$_{before}$, the FWHM$_{after}$, and the difference ($S_{after}-S_{before}$) are respectively in the ranges described above. The inventors have surmised the following (1) to (3), regarding the reasons that the magnetic tape has excellent running stability, while the total thickness of the non-magnetic layer and the magnetic layer is equal to or smaller than 0.60 μm. However, the invention is not limited to the surmise of the inventors disclosed in the specification.

(1) Hereinafter, the surmise of the inventors regarding the surface part C—H derived C concentration will be described.

As described above, from a viewpoint of improving the running stability, it is necessary that sticking between a surface of a magnetic layer and a head is prevented in both periods of an acceleration period or a deceleration period in which the magnetic tape runs at a speed lower than a set speed, and a period in which the magnetic tape runs at the set speed (that is, a period during which the magnetic tape runs at a speed higher than the speed in the acceleration period or the deceleration period). The inventors have considered that, in the magnetic tape in which at least one or more components selected from the group consisting of fatty acid and fatty acid amide are included in the magnetic layer and the surface part C—H derived C concentration is equal to or greater than 45 atom %, a larger amount of one or more components selected from the group consisting of fatty acid and fatty acid amide is present in the extreme outermost surface part of the magnetic layer, compared to the amount thereof in the magnetic tape of the related art. The inventors have surmised that the presence of a large amount of one or more components selected from the group consisting of fatty acid and fatty acid amide in the extreme outermost surface part of the magnetic layer mainly contributes to the prevention of sticking between the surface of the magnetic layer and the head during the acceleration period or the deceleration period. The running speed of the magnetic tape in the drive (relative speed between the magnetic tape and the head) is preferably equal to or higher than 4 m/sec and more preferably equal to or higher than 7 m/sec, from a viewpoint of reducing the time necessary for the recording and/or the reproduction. For example, the running speed can be set as 7 to 15 m/sec. However, the running speed is not limited to the range described above.

(2) The surmise of the inventors regarding the $FWHM_{before}$, the $FWHM_{after}$, and the difference ($S_{after} - S_{before}$) will be described.

When recording or reproducing a signal with respect to the magnetic tape, a projection existing on the surface of the magnetic layer normally comes into contact (so-called real contact) with the head, however, a part lower than the projection of the surface of the magnetic layer (hereinafter, referred to as a "base part") does not come into contact with the head or has a low contact frequency. The inventors have surmised that the spacing measured by optical interferometry is a value which is an index of a distance between this base part and the head. However, it is thought that, when a lubricant included on the magnetic layer forms a liquid film on the surface of the magnetic layer, the liquid film is present between the base part and the head, and thus, the spacing becomes narrow by the thickness of the liquid film.

However, the lubricant is generally divided broadly into a fluid lubricant and a boundary lubricant. Fatty acid and fatty acid amide described above are known as components which can function as boundary lubricants. The surmise of the inventors regarding the components selected from the group consisting of fatty acid and fatty acid amide is as described in section (1). In contrast, fatty acid ester is known as a component which can function as a fluid lubricant. It is considered that a fluid lubricant can protect the surface of the magnetic layer by forming a liquid film on the surface of the magnetic layer. The inventors have thought that the presence of the liquid film of fatty acid ester on the surface of the magnetic layer contributes to the protection of the surface of the magnetic layer and smooth sliding between the surface of the magnetic layer and the head. However, an excessive amount of fatty acid ester present on the surface of the magnetic layer causes sticking due to the formation of a meniscus (liquid crosslinking) between the surface of the magnetic layer and the head due to fatty acid ester.

In regards to this point, the inventors focused on the idea that fatty acid ester is a component having properties of volatilizing by vacuum heating, and a difference ($S_{after} - S_{before}$) of a spacing between a state after the vacuum heating (state in which a liquid film formed by fatty acid ester is volatilized and removed) and a state before the vacuum heating (state in which the liquid film formed by fatty acid ester is present) was used as an index of a thickness of the liquid film formed on the surface of the magnetic layer by fatty acid ester. The inventors have surmised that the presence of the liquid film of fatty acid ester on the surface of the magnetic layer, so that the value of the difference is greater than 0 nm and equal to or smaller than 8.0 nm, causes the prevention of the occurrence of sticking while causing smooth sliding between the surface of the magnetic layer and the head.

(3) In addition, a smaller value of the full width at half maximum of spacing distribution measured by optical interferometry means that a variation in the values of the spacing measured on each part of the surface of the magnetic layer is small. As a result of intensive studies, the inventors found that it is effective to increase the uniformity of a contact state between the surface of the magnetic layer and the head by increasing the uniformity of a height of projection present on the surface of the magnetic layer and increasing the uniformity of a thickness of a liquid film of fatty acid ester, in order to prevent sticking between the surface of the magnetic layer and the head, specifically, in order to prevent sticking between the surface of the magnetic layer and the head during a period in which the magnetic tape runs at a speed higher than that in the acceleration period or the deceleration period.

In regards to this point, it is considered that the reason for the variation in values of the spacing is a variation in height of the projection of the surface of the magnetic layer and a variation in the thickness of the liquid film formed by fatty acid ester. The inventors have surmised that the spacing distribution $FWHM_{before}$ measured before the vacuum heating, that is, in a state where the liquid film of fatty acid ester is present on the surface of the magnetic layer, becomes great as the variation in height of the projection and the variation in the thickness of the liquid film of fatty acid ester are great, and particularly, the spacing distribution $FWHM_{before}$ is greatly affected by the variation in the thickness of the liquid film of fatty acid ester. In contrast, the inventors have surmised that the spacing distribution $FWHM_{after}$ measured after the vacuum heating, that is, in a state where the liquid film of fatty acid ester is removed from the surface of the magnetic layer, becomes great as the variation in height of the projection is great. That is, the inventors have surmised that small spacing distributions $FWHM_{before}$ and $FWHM_{after}$ mean a small variation in the thickness of the liquid film of fatty acid ester and a small variation in the height of the projection on the surface of the magnetic layer. It was clear that it is possible to prevent the sticking between the surface of the magnetic layer and the head by increasing the uniformity of the height of the projection and the thickness of the liquid film of fatty acid ester so that the spacing distributions $FWHM_{before}$ and $FWHM_{after}$ are greater than 0 nm and equal to or smaller than 7.0 nm. Specifically, it was clear that it is possible to prevent the sticking between the surface of the magnetic layer and the head mainly during the period in which the magnetic tape runs at a speed higher than that in the acceleration period or the deceleration period. In addition, it was also determined that setting the $FWHM_{after}$ to be greater than 0 nm and equal to or smaller than 7.0 nm also contributes to the prevention of sticking between the surface of the magnetic layer and the head during the acceleration period or the deceleration period. JP2012-43495A also discloses the description regarding the spacing. However, JP2012-43495A does not disclose descriptions regarding the spacing before and after the vacuum heating and the spacing distributions and descriptions regarding the control of the spacing distributions.

However, the above-mentioned description is merely a surmise of the inventors and the invention is not limited thereto.

Hereinafter, the magnetic tape will be described more specifically.

Surface Part C—H Derived C Concentration

The surface part C—H derived C concentration of the magnetic tape is equal to or greater than 45 atom %. The surface part C—H derived C concentration is preferably equal to or greater than 48 atom %, more preferably equal to or greater than 50 atom %, even more preferably equal to or greater than 55 atom %, and still more preferably equal to or greater than 60 atom %, from a viewpoint of further preventing the sticking between the surface of the magnetic layer and the head (specifically, sticking between the surface of the magnetic layer and the head during the acceleration period or the deceleration period in which the magnetic tape runs at a speed lower than the set speed). The upper limit of the surface part C—H derived C concentration, for example, can be set to be equal to or smaller than 95 atom %, equal to or smaller than 90 atom %, equal to or smaller than 85 atom %, equal to or smaller than 80 atom %, equal to or smaller than 75 atom %, and equal to or smaller than 70 atom %. However, according to the studies of the inventors, it was found that a higher surface part C—H derived C concentration is preferable, in order to prevent the sticking between the surface of the magnetic layer and the head (specifically, sticking between the surface of the magnetic layer and the head during the acceleration period or the deceleration period in which the magnetic tape runs at a speed lower than the set speed) even more. Thus, the upper limit of the surface part C—H derived C concentration is not limited to the exemplified values.

As described above, the surface part C—H derived C concentration is a value obtained by analysis using ESCA. A region for the analysis is a region having an area of 300 µm×700 µm at an arbitrary position of the surface of the magnetic layer of the magnetic tape. The qualitative analysis is performed by wide scan measurement (pass energy: 160 eV, scan range: 0 to 1,200 eV, energy resolution: 1 eV/step) performed by ESCA. Then, spectra of entirety of elements detected by the qualitative analysis are obtained by narrow scan measurement (pass energy: 80 eV, energy resolution: 0.1 eV, scan range: set for each element so that the entirety of spectra to be measured is included). An atomic concentration (unit: atom %) of each element is calculated from the peak surface area of each spectrum obtained as described above. Here, an atomic concentration (C concentration) of carbon atoms is also calculated from the peak surface area of C1s spectra.

In addition, C1s spectra are obtained (pass energy: 10 eV, scan range: 276 to 296 eV, energy resolution: 0.1 eV/step). The obtained Cis spectra are subjected to a fitting process by a nonlinear least-squares method using a Gauss-Lorentz complex function (Gaussian component: 70%, Lorentz component: 30%), peak resolution of a peak of a C—H bond of the C1s spectra is performed, and a percentage (peak area ratio) of the separated C—H peak occupying the C1s spectra is calculated. A C—H derived C concentration is calculated by multiplying the calculated C—H peak area ratio by the C concentration.

An arithmetical mean of values obtained by performing the above-mentioned process at different positions of the surface of the magnetic layer of the magnetic tape three times is set as the surface part C—H derived C concentration. In addition, the specific aspect of the process described above is shown in Examples which will be described later.

As preferred means for adjusting the surface part C—H derived C concentration described above to be equal to or greater than 45 atom %, a cooling step can be performed in a non-magnetic layer forming step which will be described later specifically. However, the magnetic tape is not limited to a magnetic tape manufactured through such a cooling step.

Spacing Distributions $FWHM_{before}$ and $FWHM_{after}$

Both the spacing distribution $FWHM_{before}$ before the vacuum heating and the spacing distribution $FWHM_{after}$ after the vacuum heating which are measured in the magnetic tape are greater than 0 nm and equal to or smaller than 7.0 nm. The inventors have surmised that this point contributes to the prevention of sticking between the surface of the magnetic layer and the head (specifically, sticking between the surface of the magnetic layer and the head during the period in which the magnetic tape runs at a speed higher than that in the acceleration period or the deceleration period). From a viewpoint of further preventing the sticking, the $FWHM_{before}$ and the $FWHM_{after}$ are preferably equal to or smaller than 6.5 nm, more preferably equal to or smaller than 6.0 nm, even more preferably equal to or smaller than 5.5 nm, still more preferably equal to or smaller than 5.0 nm, and still even more preferably equal to or smaller than 4.5 nm. The $FWHM_{before}$ and the $FWHM_{after}$ can be, for example, equal to or greater than 0.5 nm, equal to or greater than 1.0 nm, equal to or greater than 2.0 nm, or equal to or greater than 3.0 nm. Meanwhile, from a viewpoint of preventing the sticking between the surface of the magnetic layer and the head (specifically, sticking between the surface of the magnetic layer and the head during the period in which the magnetic tape runs at a speed higher than that in the acceleration period or the deceleration period), it is preferable that the values thereof are small, and therefore, the values thereof may be smaller than the exemplified values.

The spacing distribution $FWHM_{before}$ before the vacuum heating can be decreased mainly by decreasing the variation in the thickness of the liquid film formed by fatty acid ester. An example of a specific method will be described later. Meanwhile, the spacing distribution $FWHM_{after}$ after the vacuum heating can be decreased by decreasing the variation in height of the projection of the surface of the magnetic layer. In order to perform the decreasing described above, it is preferable that a presence state of the powder component included in the magnetic layer, for example, non-magnetic filler, which will be described later specifically, in the magnetic layer is controlled. An example of a specific method will be described later.

Difference ($S_{after}-S_{before}$)

The difference ($S_{after}-S_{before}$) of the spacings before and after the vacuum heating measured in the magnetic tape is greater than 0 nm and equal to or smaller than 8.0 nm. From a viewpoint of allowing smooth sliding between the surface of the magnetic layer and the head, the difference ($S_{after}-S_{before}$) is preferably equal to or greater than 0.1 nm, more preferably equal to or greater than 1.0 nm, even more preferably equal to or greater than 1.5 nm, and still more preferably equal to or greater than 2.0 nm. Meanwhile, from a viewpoint of further preventing the sticking between the surface of the magnetic layer and the head, the difference ($S_{after}-S_{before}$) is preferably equal to or smaller than 7.5 nm, more preferably equal to or smaller than 7.0 nm, even more preferably equal to or smaller than 6.0 nm, still more preferably equal to or smaller than 5.0 nm, further more preferably equal to or smaller than 4.0 nm, still more preferably equal to or smaller than 3.5 nm, and still even more preferably equal to or smaller than 3.0 nm. The difference ($S_{after}-S_{before}$) can be controlled by the amount of fatty acid ester added to a magnetic layer forming composition. In addition, the difference ($S_{after}-S_{before}$) can also be controlled by the amount of fatty acid ester added to a non-magnetic layer forming composition. The non-magnetic layer can play a role in holding a lubricant and supplying the lubricant to the magnetic layer, and this is because fatty acid ester included in the non-magnetic layer may be moved to the magnetic layer and be present on the surface of the magnetic layer.

Fatty Acid and Fatty Acid Amide

The magnetic tape includes one or more components selected from the group consisting of fatty acid and fatty acid amide at least in the magnetic layer. The magnetic layer may include only one or both of fatty acid and fatty acid amide. The inventors have considered that the surface part C—H derived C concentration may become an index of the amount of the components present in the extreme outermost surface part of the magnetic layer as described above. In addition, one or more components selected from the group consisting of fatty acid and fatty acid amide may be included in the non-magnetic layer. The non-magnetic layer can play a role in holding a lubricant such as fatty acid or fatty acid amide and supplying the lubricant to the magnetic layer. The lubricant such as fatty acid or fatty acid amide included in the non-magnetic layer may be moved to the magnetic layer and be present in the magnetic layer.

Examples of fatty acid include lauric acid, myristic acid, palmitic acid, stearic acid, oleic acid, linoleic acid, linolenic acid, behenic acid, erucic acid, and elaidic acid, and stearic acid, myristic acid, and palmitic acid are preferable, and stearic acid is more preferable. Fatty acid may be included in the magnetic layer in a state of salt such as metal salt.

As fatty acid amide, amide of various fatty acid described above is used, and specific examples thereof include lauric acid amide, myristic acid amide, palmitic acid amide, and stearic acid amide.

Regarding fatty acid and a derivative of fatty acid (amide and ester which will be described later), a part derived from fatty acid of the fatty acid derivative preferably has a structure which is the same as or similar to that of fatty acid used in combination. As an example, in a case of using fatty acid and stearic acid, it is preferable to use stearic acid amide and/or stearic acid ester.

The content of fatty acid of a magnetic layer forming composition is, for example, 0.1 to 10.0 parts by mass and is preferably 1.0 to 7.0 parts by mass, with respect to 100.0 parts by mass of ferromagnetic powder. In a case of adding two or more kinds of different fatty acids to the magnetic layer forming composition, the content thereof is the total content of two or more kinds of different fatty acids. The same applies to other components. In addition, in the invention and the specification, a given component may be used alone or used in combination of two or more kinds thereof, unless otherwise noted.

The content of fatty acid amide in the magnetic layer forming composition is, for example, 0 to 3.0 parts by mass, preferably 0.1 to 3.0 parts by mass, and more preferably 0.1 to 1.0 part by mass with respect to 100.0 parts by mass of ferromagnetic powder.

Meanwhile, the content of fatty acid in a non-magnetic layer forming composition is, for example, 1.0 to 10.0 parts by mass and is preferably 1.0 to 7.0 parts by mass with respect to 100.0 parts by mass of non-magnetic powder. In addition, the content of fatty acid amide in the non-magnetic layer forming composition is, for example, 0 to 3.0 parts by mass, preferably 0.1 to 3.0 parts by mass, and more preferably 0.1 to 1.0 part by mass with respect to 100.0 parts by mass of non-magnetic powder.

Fatty Acid Ester

The magnetic tape includes fatty acid ester in the magnetic layer. The surmise of the inventors regarding fatty acid ester and the spacing and the spacing distributions is as described above. The fatty acid ester may be included alone as one type or two or more types thereof may be included in the magnetic layer. In addition, fatty acid ester may be included or may not be included in the non-magnetic layer.

Examples of fatty acid ester include esters of lauric acid, myristic acid, palmitic acid, stearic acid, oleic acid, linoleic acid, linolenic acid, behenic acid, erucic acid, and elaidic acid. Specific examples thereof include butyl myristate, butyl palmitate, butyl stearate (butyl stearate), neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

The content of fatty acid ester of the magnetic layer forming composition is, for example, 0.1 to 10.0 parts by mass and is preferably 1.0 to 7.0 parts by mass with respect to 100.0 parts by mass of ferromagnetic powder.

The content of fatty acid ester in the non-magnetic layer forming composition is, for example, 0 to 10.0 parts by mass and is preferably 0.1 to 8.0 parts by mass with respect to 100.0 parts by mass of non-magnetic powder.

Hereinafter, the magnetic layer, the non-magnetic layer, and the like of the magnetic tape will be described more specifically.

Magnetic Layer

Ferromagnetic Powder

As the ferromagnetic powder included in the magnetic layer, ferromagnetic powder normally used in the magnetic layer of various magnetic recording media can be used. It is preferable to use ferromagnetic powder having a small average particle size, from a viewpoint of improvement of recording density of the magnetic tape. From this viewpoint, ferromagnetic powder having an average particle size equal to or smaller than 50 nm is preferably used as the ferromagnetic powder. Meanwhile, the average particle size of the ferromagnetic powder is preferably equal to or greater than 10 nm, from a viewpoint of stability of magnetization.

As a preferred specific example of the ferromagnetic powder, ferromagnetic hexagonal ferrite powder can be used. An average particle size of the ferromagnetic hexagonal ferrite powder is preferably 10 nm to 50 nm and more preferably 20 nm to 50 nm, from a viewpoint of improvement of recording density and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. An average particle size of the ferromagnetic metal powder is preferably 10 nm to 50 nm and more preferably 20 nm to 50 nm, from a viewpoint of improvement of recording density and stability of magnetization. For details of the ferromagnetic metal powder, descriptions disclosed in paragraphs 0137 to 0141 of JP2011-216149A and paragraphs 0009 to 0023 of JP2005-251351A can be referred to, for example.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed onto a printing paper so that a total magnification of 500,000 of an image of particles configuring the powder is obtained. A target particle is selected from the obtained image of particles, an outline of the particle is traced with a digitizer, and the size of the particle (primary particle) is measured. The primary particle is an independent particle which is not aggregated.

The measurement described above is performed regarding 500 particles arbitrarily extracted. An arithmetical mean of the particle size of 500 particles obtained as described above is the average particle size of the powder. As the transmission electron microscope, a transmission electron microscope H-9000 manufactured by Hitachi, Ltd. can be used, for example. In addition, the measurement of the particle size can be performed by a well-known image analysis software, for example, image analysis software KS-400 manufactured by Carl Zeiss. The average particle size shown in Examples which will be described later is measured by using transmission electron microscope H-9000 manufactured by Hitachi, Ltd. as the transmission electron microscope, and image analysis software KS-400 manufactured by Carl Zeiss as the image analysis software, unless otherwise noted.

As a method for collecting a sample powder from the magnetic tape in order to measure the particle size, a method disclosed in a paragraph of 0015 of JP2011-48878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter, and an average plate ratio is an arithmetical mean of (maximum long diameter/thickness or height). In a case of the definition (3), the average particle size is an average diameter (also referred to as an average particle diameter).

The content (filling percentage) of the ferromagnetic powder of the magnetic layer is preferably in a range of 50 to 90 mass % and more preferably in a range of 60 to 90 mass %. The components other than the ferromagnetic powder of the magnetic layer are at least a binder, fatty acid ester, and one or more components selected from the group consisting of fatty acid and fatty acid amide, and one or more kinds of additives may be arbitrarily included. A high filling percentage of the ferromagnetic powder in the magnetic layer is preferable from a viewpoint of an improvement in the recording density.

Binder

The magnetic tape includes a binder in the magnetic layer. The binder is one or more kinds of resin. As the binder, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be a homopolymer or a copolymer. These resins can be used as the binder even in the non-magnetic layer and/or a back coating layer which will be described later. For the binder described above, descriptions disclosed in paragraphs 0028 to 0031 of JP2010-24113A can be referred to. In addition, the binder may be a radiation curable resin such as an electron beam-curable resin. For the radiation curable resin, descriptions disclosed in paragraphs 0044 and 0045 of JP2011-48878A can be referred to.

In addition, a curing agent can be used together with a resin which can be used as the binder. The curing agent is a compound including at least one and preferably two or more crosslinking functional groups in one molecule. As the curing agent, polyisocyanate is suitable. For the details of polyisocyanate, descriptions disclosed in paragraphs 0124 and 0125 of JP2011-216149A can be referred to. The amount of the curing agent used can be, for example, 0 to 80.0 parts by mass with respect to 100.0 parts by mass of the binder, and is preferably 50.0 to 80.0 parts by mass, from a viewpoint of improvement of strength of each layer such as the magnetic layer.

Other Components

Additives can be added to the magnetic layer, if necessary. It is preferable that the magnetic layer includes one or more kinds of the non-magnetic filler. As the non-magnetic filler, a non-magnetic filler (hereinafter, also referred to as a "projection formation agent") which is added for controlling the projection of the surface of the magnetic layer and a non-magnetic filler which is added as an abrasive imparting abrasive properties to the surface of the magnetic layer are mainly used. The magnetic layer preferably includes at least the projection formation agent and more preferably includes the projection formation agent and the abrasive.

The non-magnetic filler which can function as the projection formation agent may be inorganic powder or organic powder, and is preferably inorganic powder. In addition, carbon black is also preferable. An average particle size (average primary particle size) of carbon black is preferably equal to or greater than 20 nm and more preferably equal to or greater than 30 nm. In addition, the average particle size of carbon black is preferably equal to or smaller than 150 nm and more preferably equal to or smaller than 100 nm.

Examples of the inorganic powder include powder of metal oxide, metal carbonate, metal sulfate, metal nitride, metal carbide, and metal sulfide, and specific examples thereof include powder of inorganic substances such as α-alumina, β-alumina, γ-alumina, θ-alumina, silicon oxide such as silicon dioxide, silicon carbide, chromium oxide, cerium oxide, α-iron oxide, goethite, corundum, silicon nitride, titanium carbide, titanium dioxide, tin oxide, magnesium oxide, tungsten oxide, zirconium oxide, boron nitride, zinc oxide, calcium carbonate, calcium sulfate, barium sulfate, and molybdenum disulfide, or composite inorganic substances including two or more kinds thereof. The inorganic oxide powder is more preferable and silicon oxide powder is even more preferable.

The non-magnetic filler which can function as a projection formation agent preferably has uniformity of the particle size, from a viewpoint of further improving electromagnetic conversion characteristics. From a viewpoint of availability of particles having high uniformity of the particle size, the non-magnetic filler is preferably colloidal particles. When the non-magnetic filler used in the formation of the magnetic layer can be available, it is possible to determine whether or not the non-magnetic filler included in the magnetic layer is colloidal particles, by evaluating whether or not such a non-magnetic filler has properties which are the properties of the colloidal particles described above. Alternatively, the determination can be also performed by evaluating whether or not the non-magnetic filler extracted from the magnetic layer has properties which are the properties of the colloidal particles described above. The extraction of the non-magnetic filler from the magnetic layer can be performed by the following method, for example.

1. 1 g of the magnetic layer is scraped off. The scraping can be performed, for example, by a razor blade.

2. A magnetic layer sample obtained by the scraping is put in a vessel such as an eggplant flask and 100 ml of tetrahydrofuran is added into this vessel. Examples of tetrahydrofuran include commercially available tetrahydrofuran to which a stabilizer is added and commercially available tetrahydrofuran to which a stabilizer is not added. Here, the commercially available tetrahydrofuran to which a stabilizer is not added is used. The same applies to tetrahydrofuran used in washing described hereinafter.

3. A circulation tube is attached to the vessel and heated in a water bath at a water temperature of 60° C. for 90 minutes. After filtering the content in the heated vessel with a filter paper, the solid content remaining on the filter paper is washed with tetrahydrofuran several times, and the washed solid content is moved to a vessel such as a beaker. A 4 N (4 mol/L) hydrochloric acid aqueous solution is added into this vessel and a residue remaining without being dissolved is extracted by filtering. As a filter, a filter having a hole diameter smaller than 0.05 µm is used. For example, a membrane filter used for chromatography analysis (for example, MF Millipore manufactured by Merck Millipore Corporation) can be used. The residue extracted by the filtering is washed with pure water several times and dried.

Ferromagnetic powder and organic matters (binder and the like) are dissolved by the operation described above, and a non-magnetic filler is collected as a residue.

By performing the steps described above, the non-magnetic filler can be extracted from the magnetic layer. In a case where a plurality of kinds of non-magnetic fillers are included in the non-magnetic filler extracted as described above, the plurality of kinds of non-magnetic fillers can be divided depending on differences of density.

As preferred colloidal particles, inorganic oxide colloidal particles can be used. As the inorganic oxide colloidal particles, colloidal particles of inorganic oxide described above can be used, and composite inorganic oxide colloidal particles such as $SiO_2 \cdot Al_2O_3$, $SiO_2 \cdot B_2O_3$, $TiO_2 \cdot CeO_2$, $SnO_2 \cdot Sb_2O_3$, $SiO_2 \cdot Al_2O_3 \cdot TiO_2$, and $TiO_2 \cdot CeO_2 \cdot SiO_2$. The inorganic oxide colloidal particles such as $SiO_2$, $Al_2O_3$, $TiO_2$, $ZrO_2$, and $Fe_2O_3$ are preferable and silica colloidal particles (colloidal silica) is particularly preferable. Meanwhile, typical colloidal particles have a hydrophilic surface, and thus, the colloidal particles are suitable for manufacturing a colloidal solution using water as a dispersion medium. For example, colloidal silica obtained by a general synthesis method has a surface covered with polarized oxygen atoms ($O^{2-}$), and thus, colloidal silica adsorbs water in water, forms a hydroxyl group, and is stabilized. However, these particles are hardly present in a colloidal state, in an organic solvent normally used in the magnetic layer forming composition. With respect to this, the colloidal particles of the invention and the specification are particles which are not precipitated but are dispersed to cause a colloidal dispersion, when 1 g thereof is added with respect to 100 mL of the organic solvent described above. Such colloidal particles can be prepared by a well-known method of hydrophobing the surface by surface treatment. For details of such hydrophobization treatment, descriptions disclosed in JP1993-269365A (JP-H05-269365A), JP1993-287213A (JP-H05-287213A), and JP2007-63117A are referred to.

As a manufacturing method of the silica colloidal particles (colloidal silica) which are preferred colloidal particles, two kinds of methods such as a water glass method and a sol-gel method are generally known. The water glass method is a method of using silica soda (sodium silicate, so-called water glass) as a raw material, performing ion exchange with respect to this to generate an active silica, and causing particle growth. Meanwhile, the sol-gel method is a method of using tetraalkoxysilane as a raw material, and performing hydrolysis under a basic catalyst and causing particle growth at the same time. In a case of using the silica colloidal particles as the non-magnetic filler, the silica colloidal particles may be manufactured by any manufacturing method described above.

An average particle size of the non-magnetic filler which may function as a projection formation agent is preferably in a range of 50 to 200 nm, and more preferably in a range of 50 to 150 nm.

The content of the non-magnetic filler which may function as a projection formation agent in the magnetic layer is preferably 1.0 to 4.0 parts by mass and more preferably 1.5 to 3.5 parts by mass with respect to 100.0 parts by mass of the ferromagnetic powder.

Meanwhile, the non-magnetic filler which may function as an abrasive may be inorganic powder or organic powder, and the inorganic powder is preferable. Examples of the non-magnetic powder which may function as an abrasive include powders of alumina ($Al_2O_3$), silicon carbide, boron carbide ($B_4C$), $SiO_2$, TiC chromium oxide ($Cr_2O_3$), cerium oxide, zirconium oxide ($ZrO_2$), iron oxide, diamond, and the like which are materials normally used as the abrasive of the magnetic layer, and among these, alumina powder such as α-alumina and silicon carbide powder are preferable. The content of the non-magnetic filler which may function as an abrasive in the magnetic layer is preferably in a range of 1.0 to 20.0 parts by mass, more preferably in a range of 3.0 to 15.0 parts by mass, and even more preferably in a range of 4.0 to 10.0 parts by mass with respect to 100.0 parts by mass of the ferromagnetic powder. The average particle size of the non-magnetic filler which may function as an abrasive is, for example, in a range of 30 to 300 nm and preferably in a range of 50 to 200 nm.

An arbitrary amount of one or more kinds of various additives such as a dispersing agent, a dispersing assistant, an antibacterial agent, an antistatic agent, and an antioxidant may be further added to the magnetic layer. As the additives, commercially available products can be suitably selectively used according to desired properties.

The magnetic layer described above is provided on the non-magnetic layer formed on the non-magnetic support. The details of the non-magnetic layer and the non-magnetic support will be described later.

Non-Magnetic Layer

The magnetic tape includes a non-magnetic layer including non-magnetic powder and a binder between the non-magnetic support and the magnetic layer. The non-magnetic powder used in the non-magnetic layer may be inorganic powder or organic powder. In addition, carbon black and the like can be used. Examples of the inorganic powder include powders of metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably in a range of 50 to 90 mass % and more preferably in a range of 60 to 90 mass %.

In regards to other details of a binder or additives of the non-magnetic layer, the well-known technology regarding the non-magnetic layer can be applied. In addition, in regards to the type and the content of the binder, and the type and the content of the additive, for example, the well-known technology regarding the magnetic layer can be applied.

The non-magnetic layer of the invention also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Back Coating Layer

The magnetic tape can also include a back coating layer including non-magnetic powder and a binder on a side of the non-magnetic support opposite to the side including the magnetic layer. The back coating layer preferably includes any one or both of carbon black and inorganic powder. In regards to the binder included in the back coating layer and various additives which can be arbitrarily included in the back coating layer, a well-known technology regarding the treatment of the magnetic layer and/or the non-magnetic layer can be applied.

Non-Magnetic Support

Next, the non-magnetic support will be described. As the non-magnetic support (also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or thermal treatment may be performed with respect to these supports in advance.

Various Thickness

In the magnetic tape, the total thickness of the magnetic layer and the non-magnetic layer is equal to or smaller than 0.60 μm and preferably 0.50 μm, from a viewpoint of thinning the magnetic tape. In addition, the total thickness of the magnetic layer and the non-magnetic layer is, for example, equal to or greater than 0.10 μm or equal to or greater than 0.20 km.

In the thicknesses of the non-magnetic support and each layer of the magnetic tape, the thickness of the non-magnetic support is preferably 3.00 to 4.50 μm.

A thickness of the magnetic layer can be optimized in accordance with saturation magnetization quantity of the magnetic head used, a head gap length, or a band of a recording signal. The thickness of the magnetic layer is normally 0.01 μm to 0.15 μm, and is preferably 0.02 μm to 0.12 μm and more preferably 0.03 μm to 0.10 μm, from a viewpoint of realizing recording at high density. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is the total thickness of the layers.

The thickness of the non-magnetic layer is, for example, 0.10 to 0.55 μm and is preferably 0.10 to 0.50 μm.

A thickness of the back coating layer is preferably equal to or smaller than 0.90 μm and even more preferably in a range of 0.10 to 0.70 μm.

In addition, the total thickness of the magnetic tape is preferably equal to or smaller than 6.00 μm, more preferably equal to or smaller than 5.70 μm, and even more preferably equal to or smaller than 5.50 μm, from a viewpoint of improving recording capacity for 1 reel of the magnetic tape cartridge. Meanwhile, the total thickness of the magnetic tape is preferably equal to or greater than 1.00 μm, from a viewpoint of availability (handling properties) of the magnetic tape.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scan electron microscope. In the cross section observation, various thicknesses can be acquired as a thickness acquired at one position of the cross section in the thickness direction, or an arithmetical mean of thicknesses acquired at a plurality of positions of two or more positions, for example, two positions which are arbitrarily extracted. In addition, the thickness of each layer may be acquired as a designed thickness calculated according to the manufacturing conditions.

Manufacturing Method

Preparation of Each Layer Forming Composition

Each composition for forming the magnetic layer, the non-magnetic layer, or the back coating layer normally includes a solvent, together with various components described above. As the solvent, various organic solvents generally used for manufacturing a coating type magnetic recording medium can be used. Among those, from a viewpoint of solubility of the binder normally used in the coating type magnetic recording medium, the each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent of the each layer forming composition is not particularly limited, and can be set to be the same as that of the each layer forming composition of a typical coating type magnetic recording medium. In addition, steps of preparing the each layer forming composition generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. For example, a binder may be separately added in a kneading step, a dispersing step, and a mixing step for adjusting viscosity after the dispersion. In a manufacturing step of the magnetic tape, a well-known manufacturing technology of the related art can be used as a part of the step. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-79274A (JP-H01-79274A). In addition, in order to disperse the each layer forming composition, glass beads and/or other beads can be used. As such dispersion beads, zirconia beads, titania beads, and steel beads which are dispersion beads having high specific gravity are suitable. These dispersion beads are preferably used by optimizing a bead diameter and a filling percentage. As a dispersion device, a well-known dispersion device can be used.

Coating Step, Cooling Step, and Heating and Drying Step

The magnetic layer can be formed by performing multi-layer coating of the magnetic layer forming composition with the non-magnetic layer forming composition in order or at the same time. For details of the coating for forming each layer, a description disclosed in a paragraph 0066 of JP2010-231843A can be referred to.

In a preferred aspect, the magnetic tape can be manufactured by successive multilayer coating. A manufacturing step of performing the successive multilayer coating can be preferably performed as follows. The non-magnetic layer is formed through a coating step of applying a non-magnetic layer forming composition onto a non-magnetic support to form a coating layer, and a heating and drying step of drying the formed coating layer by a heating process. In addition, the magnetic layer is formed through a coating step of applying a magnetic layer forming composition onto the formed non-magnetic layer to form a coating layer, and a heating and drying step of drying the formed coating layer by a heating process.

In the manufacturing method of performing such successive multilayer coating, it is preferable to perform the non-magnetic layer forming step by using the non-magnetic layer forming composition including one or more components selected from the group consisting of fatty acid and fatty acid amide in the coating step, and to perform a cooling step of cooling the coating layer between the coating step and the heating and drying step, in order to adjust the surface part C—H derived C concentration to be equal to or greater than 45 atom %, in the magnetic tape including at least one or more components selected from the group consisting of fatty acid and fatty acid amide in the magnetic layer. The reason thereof is not clear, but the inventors has surmised that the reason thereof is because the components (fatty acid and/or fatty acid amide) are moved to the surface of the non-magnetic layer at the time of solvent volatilization of the heating and drying step, by cooling the coating layer of the non-magnetic layer forming composition before the heating and drying step. However, this is merely the surmise, and the invention is not limited thereto.

In the magnetic layer forming step, a coating step of applying a magnetic layer forming composition including ferromagnetic powder, a binder, and a solvent onto a non-magnetic layer to form a coating layer, and a heating and drying step of drying the formed coating layer by a heating process can be performed. The magnetic tape includes one or more components selected from the group consisting of fatty acid and fatty acid amide and fatty acid ester at least in the magnetic layer. In order to manufacture such a magnetic tape, the magnetic layer forming composition preferably includes one or more components selected from the group consisting of fatty acid and fatty acid amide and fatty acid ester. However, it is not necessary that the magnetic layer forming composition includes one or more components selected from the group consisting of fatty acid and fatty acid amide and fatty acid ester. This is because that a magnetic layer including these components can be formed, by applying the magnetic layer forming composition onto a non-magnetic layer to form the magnetic layer, after the components included in the non-magnetic layer forming composition have moved to the surface of the non-magnetic layer.

In addition, as a preferred manufacturing method, a manufacturing method of applying vibration to the magnetic layer can be used, in order to improve uniformity of the thickness of the liquid film formed on the surface of the magnetic layer by fatty acid ester. The inventors have surmised that, by adding vibration, the liquid film formed on the surface of the magnetic layer by fatty acid ester flows and the uniformity of the thickness of the liquid film is improved.

That is, the magnetic tape can be manufactured by a manufacturing method of forming the magnetic layer by applying and drying the magnetic layer forming composition with the non-magnetic layer forming composition in order or at the same time, and applying vibration to the formed magnetic layer (imparting vibration). Means for applying vibration are not particularly limited. For example, the vibration can be applied to the magnetic layer, by bringing the surface of the non-magnetic support, provided with the magnetic layer formed, on a side opposite to the magnetic layer to come into contact with a vibration imparting unit. The non-magnetic support, provided with the magnetic layer formed, may run while coming into contact with a vibration imparting unit. The vibration imparting unit, for example, includes an ultrasonic vibrator therein, and accordingly, vibration can be applied to a product coming into contact with the unit. It is possible to adjust the vibration applied to the magnetic layer by a vibration frequency, and strength of the ultrasonic vibrator, and/or the contact time with the vibration imparting unit. For example, the contact time can be adjusted by a running speed of the non-magnetic support, provided with the magnetic layer formed, while coming into contact with the vibration imparting unit. The vibration imparting conditions are not particularly limited, and may be set so as to control the spacing distribution, particularly, the spacing distribution $FWHM_{before}$ before vacuum heating. In order to set the vibration imparting conditions, a preliminary experiment can be performed before the actual manufacturing, and the conditions can be optimized.

In addition, the spacing distribution $FWHM_{after}$ after the vacuum heating tends to decrease when the dispersion conditions of the magnetic layer forming composition are reinforced (for example, the number of times of dispersion is increased, the dispersion time is extended, and the like), and/or the filtering conditions are reinforced (for example, a filter having a small hole diameter is used as a filter used in the filtering, the number of times of filtering is increased, and the like). The inventors have surmised that this is because the uniformity of the height of the projection present on the surface of the magnetic layer is improved, by improving dispersibility and/or the uniformity of the particle size of the powder component included in the magnetic layer forming composition, particularly, the non-magnetic filler which may function as the projection formation agent described above. A preliminary experiment can be performed before the actual manufacturing, and the dispersion conditions and/or the filtering conditions can be optimized.

In addition, in the magnetic tape including the magnetic layer including carbon black as the non-magnetic filler, it is effective to use the dispersing agent for improving the dispersibility of carbon black as a magnetic layer component, in order to decrease the spacing distribution $FWHM_{after}$ after the vacuum heating. For example, organic tertiary amine can be used as a dispersing agent of carbon black. For details of the organic tertiary amine, descriptions disclosed in paragraphs 0011 to 0018 and 0021 of JP2013-049832A can be referred to. The organic tertiary amine is more preferably trialkylamine. An alkyl group included in trialkylamine is preferably an alkyl group having 1 to 18 carbon atoms. The three alkyl groups included in trialkylamine may be the same as each other or different from each other. For details of the alkyl group, descriptions disclosed in paragraphs 0015 to 0016 of JP2013-049832A can be referred to. As trialkylamine, trioctylamine is particularly preferable.

Hereinafter, a specific aspect of the manufacturing method of the magnetic tape will be described with reference to FIG. 1. However, the invention is not limited to the following specific aspect.

FIG. 1 is a step schematic view showing a specific aspect of the step for manufacturing the magnetic tape including a non-magnetic layer and a magnetic layer in this order on one surface of a non-magnetic support and including a back coating layer on the other surface thereof. In the aspect shown in FIG. 1, an operation of sending a non-magnetic support (elongated film) from a sending part and winding the non-magnetic support around a winding part is continuously performed, and various processes of coating, drying, and orientation are performed in each part or each zone shown in FIG. 1, and thus, it is possible to sequentially form a non-magnetic layer and a magnetic layer on one surface of the running non-magnetic support by a multilayer coating and to form a back coating layer on the other surface thereof. The manufacturing step, which is normally performed for manufacturing the coating type magnetic recording medium, can be performed in the same manner except for including a cooling zone and including a vibration imparting part for imparting vibration to the magnetic layer.

The non-magnetic layer forming composition is applied onto the non-magnetic support sent from the sending part in a first coating part (coating step of non-magnetic layer forming composition). As described above, the non-magnetic layer forming composition preferably includes one or more components selected from the group consisting of fatty acid and fatty acid amide. The non-magnetic layer forming composition preferably further includes fatty acid ester.

After the coating step, a coating layer of the non-magnetic layer forming composition formed in the coating step is cooled in a cooling zone (cooling step). For example, it is possible to perform the cooling step by allowing the non-magnetic support on which the coating layer is formed to pass through a cooling atmosphere. An atmosphere temperature of the cooling atmosphere is preferably in a range of −10° C. to 0° C. and more preferably in a range of −5° C. to 0° C. The time for performing the cooling step (for example, a time during which an arbitrary part of the coating layer is delivered to and sent from the cooling zone (hereinafter, also referred to as a "staying time")) is not particularly limited, and when the time described above is long, the surface part C—H derived C concentration tends to be increased. Thus, the time described above is preferably adjusted by performing a preliminary experiment if necessary, so that the surface part C—H derived C concentration equal to or greater than 45 atom % is realized. In the cooling step, cooled air may blow onto the surface of the coating layer.

After the cooling zone, in a first heating process zone, the coating layer is heated after the cooling step to dry the coating layer (heating and drying step). The heating and drying process can be performed by causing the non-magnetic support including the coating layer after the cooling step to pass through the heated atmosphere. An atmosphere temperature of the heated atmosphere, here is, for example, approximately 60° to 140°. Here, the atmosphere temperature may be a temperature at which the solvent is volatilized and the coating layer is dried, and the atmosphere temperature is not limited to the atmosphere temperature in the range described above. In addition, the heated air may blow onto the surface of the coating layer. The points described above are also applied to a heating and drying step of a second heating process zone and a heating and drying step of a third heating process zone which will be described later, in the same manner. In addition, a curing process for curing the non-magnetic layer may be performed after the heating and drying step, in accordance with the materials of the non-magnetic layer forming composition. For example, in a case of using the non-magnetic layer forming composition including an electron beam-curable resin, electron beam irradiation can be performed as the curing process. The same applies to the formation of other layers such as the magnetic layer.

Next, in a second coating part, the magnetic layer forming composition is applied onto the non-magnetic layer formed by performing the heating and drying step in the first heating process zone (coating step of the magnetic layer forming composition). The magnetic layer forming composition preferably includes fatty acid ester. In addition, the magnetic layer forming composition preferably includes one or more components selected from the group consisting of fatty acid and fatty acid amide.

After that, while the coating layer of the magnetic layer forming composition is wet, an orientation process of the ferromagnetic powder in the coating layer is arbitrarily performed in an orientation zone, if necessary. For the orientation process, a description disclosed in a paragraph 0067 of JP2010-231843A can be referred to. After the arbitrarily performed orientation process, the coating layer is subjected to a heating and drying step in a second heating process zone.

Next, in a vibration imparting part, vibration is imparted to the magnetic layer dried in the heating and drying step. The details of the vibration imparting are as described above.

Next, in the third coating part, a back coating layer forming composition is applied to a surface of the non-magnetic support on a side opposite to the surface where the non-magnetic layer and the magnetic layer are formed, to form a coating layer (coating step of back coating layer forming composition). After that, the coating layer is heated and dried in the third heating process zone.

By the step described above, it is possible to obtain the magnetic tape including the non-magnetic layer and the magnetic layer in this order on one surface of the non-magnetic support and including the back coating layer on the other surface thereof.

In order to manufacture the magnetic tape, well-known various processes for manufacturing the coating type magnetic recording medium can be performed. For example, for various processes, descriptions disclosed in paragraphs 0068 and 0069 of JP2010-231843A can be referred to.

Hereinabove, an aspect of the preferred manufacturing method has been described. However, the magnetic tape is not limited to a magnetic tape manufactured by the manufacturing method described above.

In the magnetic tape according to one aspect of the invention described above, the total thickness of the non-magnetic layer and the magnetic layer is equal to or smaller than 0.60 µm and excellent running stability can be exhibited.

EXAMPLES

Hereinafter, the invention will be described with reference to Examples. However, the invention is not limited to aspects shown in Examples. "Parts" in the following description means "parts by mass", unless otherwise noted.

Example 1

Magnetic Layer Forming Composition
Magnetic Solution
Ferromagnetic hexagonal ferrite powder: 100.0 parts
(coercivity Hc: 2100 Oe (168 kA/m), average particle size: 25 nm)
Sulfonic acid group-containing polyurethane resin: 15.0 parts
Cyclohexanone: 150.0 parts
Methyl ethyl ketone: 150.0 parts
Abrasive Liquid
α-alumina (average particle size of 110 nm): 9.0 parts
Vinyl chloride copolymer: (MR110 manufactured by Zeon Corporation): 0.7 parts
Cyclohexanone: 20.0 parts
Silica Sol
Colloidal silica prepared by a sol-gel method (average particle size: 120 nm): 3.5 parts
Methyl ethyl ketone: 8.2 parts
Other Components
Butyl stearate: 1.0 part
Stearic acid: 1.0 part
Polyisocyanate (CORONATE manufactured by Nippon Polyurethane Industry): 2.5 parts
Finishing Additive Solvent
Cyclohexanone: 180.0 parts
Methyl ethyl ketone: 180.0 parts
Non-Magnetic Layer Forming Composition
Non-magnetic inorganic powder (α-iron oxide): 80.0 parts
(average particle size: 0.15 µm, average acicular ratio: 7, Brunauer-Emmett-Teller (BET) specific surface area: 52 m$^2$/g)
Carbon black (average particle size of 20 nm): 20.0 parts
Electron beam-curable vinyl chloride copolymer: 13.0 parts
Electron beam-curable polyurethane resin: 6.0 parts
Phenylphosphonic acid: 3.0 parts
Cyclohexanone: 140.0 parts
Methyl ethyl ketone: 170.0 parts
Butyl stearate: see Table 5
Stearic acid: see Table 5
Back Coating Layer Forming Composition
Non-magnetic inorganic powder (α-iron oxide): 80.0 parts
(average particle size: 0.15 µm, average acicular ratio: 7, BET specific surface area: 52 m$^2$/g)
Carbon black (average particle size of 20 nm): 20.0 parts
Carbon black (average particle size of 100 nm): 3.0 parts
Vinyl chloride copolymer: 13.0 parts
Sulfonic acid group-containing polyurethane resin: 6.0 parts
Phenylphosphonic acid: 3.0 parts
Cyclohexanone: 140.0 parts
Methyl ethyl ketone: 170.0 parts
Stearic acid: 3.0 parts
Polyisocyanate (CORONATE manufactured by Nippon Polyurethane Industry): 5.0 parts
Methyl ethyl ketone: 400.0 parts
Preparation of Each Layer Forming Composition
The magnetic layer forming composition was prepared by the following method.

The magnetic solution was kneaded and diluted by an open kneader, and subjected to a dispersing process of 12 passes, with a transverse beads mill dispersion device and zirconia (ZrO$_2$) beads (hereinafter, referred to as "Zr beads") having a bead diameter of 0.5 mm, by setting a bead filling percentage as 80 volume %, a circumferential speed of rotor tip as 10 m/sec, and a retention time for 1 pass as 2 minutes.

After mixing the components described above, the abrasive solution was put into a vertical sand mill dispersion device together with Zr beads having a bead diameter of 1 mm, the bead volume/(abrasive solution volume+bead volume) was adjusted to be 60%, the sand mill dispersing process was performed for 180 minutes, a solution after the process was extracted, and an ultrasonic dispersion filtering process was performed with a flow-type ultrasonic dispersion filtering device.

The magnetic solution, the silica sol, the abrasive solution, other components, and the finishing additive solvent were introduced into a dissolver stirring device, and stirred at a circumferential speed of 10 m/sec for 30 minutes. After that, the treatment was performed with a flow-type ultrasonic dispersion device at a flow rate of 7.5 kg/min for the number of times of passes shown in Table 5, and then, a magnetic layer forming composition was prepared by performing filtering with a filter having a hole diameter shown in Table 5, for the number of times of passes shown in Table 5.

The non-magnetic layer forming composition was prepared by the following method. Each component excluding a lubricant (butyl stearate and stearic acid) was kneaded with an open kneader and diluted, and then, was dispersed by using a horizontal beads mill dispersion device. After that, the lubricant (butyl stearate and stearic acid) was added thereto, and stirred and mixed with a dissolver stirring device, to prepare a non-magnetic layer forming composition.

The back coating layer forming composition was prepared by the following method. Each component excluding the lubricant (stearic acid), polyisocyanate, and methyl ethyl ketone (400.0 parts) was kneaded with an open kneader and diluted, and then, was dispersed by using a horizontal beads mill dispersion device. After that, the lubricant (stearic acid), polyisocyanate, and methyl ethyl ketone (400.0 parts) were added thereto, and stirred and mixed with a dissolver stirring device, to prepare a back coating layer forming composition.

Manufacturing of Magnetic Tape

A magnetic tape was manufactured with reference to the specific aspects shown in FIG. 1. The magnetic tape was specifically manufactured as follows.

A polyethylene naphthalate support having a thickness shown in Table 5 was sent from the sending part, and the non-magnetic layer forming composition was applied to one surface thereof so that the thickness after the drying became the thickness shown in Table 5 in the first coating part, to form a coating layer. The cooling step was performed by passing the formed coating layer through the cooling zone in which the atmosphere temperature was adjusted to 0° C. for the staying time shown in Table 5 while the coating layer was wet, the heating and drying step was performed by passing the coating layer through the first heating process zone at an atmosphere temperature of 100° C., to dry the coating layer, and then, an electron beam was emitted with an energy of 40 kGy at an acceleration voltage of 125 kV, to form a non-magnetic layer.

Then, the magnetic layer forming composition was applied onto the formed non-magnetic layer so that the thickness after the drying became the thickness shown in Table 5 in the second coating part, to form a coating layer, and the coating layer was dried in the second heating process zone (atmosphere temperature of 100° C.) to form a magnetic layer.

Figure 2:
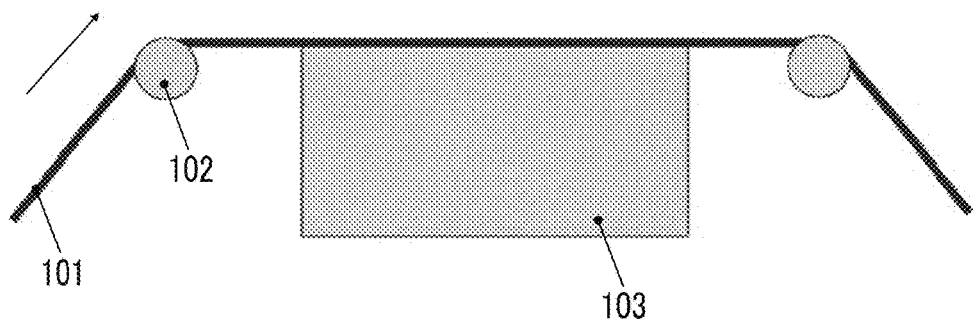
FIG. 2 is a schematic configuration diagram of a vibration imparting device used in Examples.

After that, the support, provided with the magnetic layer formed, was installed into a vibration imparting device shown in FIG. 2 so that the surface thereof on a side opposite to the surface where the magnetic layer was formed came into contact with the vibration imparting unit, and the support (in FIG. 2, reference numeral 101), provided with the magnetic layer formed, was transported at a transportation speed of 0.5 m/sec, to apply vibration to the magnetic layer. In FIG. 2, a reference numeral 102 denotes a guide roller (a reference numeral 102 denotes one of the two guide rollers), a reference numeral 103 denotes the vibration imparting device (vibration imparting unit including the ultrasonic vibrator), and an arrow denotes the transportation direction. The time from the start of the contact of the arbitrary portion of the support, provided with the magnetic layer formed, with the vibration imparting unit until the end of the contact is shown in Table 5 as the vibration imparting time. The vibration imparting unit used includes an ultrasonic vibrator therein. The vibration was imparted by setting a vibration frequency and the intensity of the ultrasonic vibrator as the values shown in Table 5.

After that, in the third coating part, the back coating layer forming composition was applied to the surface of the support on a side opposite to the surface where the non-magnetic layer and the magnetic layer were formed, so that the thickness after the drying became the thickness shown in Table 5, to form a coating layer, and the formed coating layer was dried in a third heating process zone (atmosphere temperature of 100° C.). After that, the surface smoothing treatment (calender process) was performed with a calender roll configured of only a metal roll, at a calender process speed of 80 m/min, linear pressure of 300 kg/cm (294 kN/m), and a surface temperature of a calender roll of 95° C.

Then, the thermal treatment was performed in the environment of the atmosphere temperature of 70° C. for 36 hours. After the thermal treatment, the slitting was performed so as to have a width of ½ inches (0.0127 meters), and the surface of the magnetic layer was cleaned with a tape cleaning device in which a nonwoven fabric and a razor blade are attached to a device including a sending and winding devices of the slit so as to press the surface of the magnetic layer.

By doing so, the magnetic tape was manufactured.

Examples 2 to 5 and Comparative Examples 1 to 11

A magnetic tape was manufactured in the same manner as in Example 1, except the list of the non-magnetic layer forming composition and/or the manufacturing conditions were changed as shown in Table 5. The vibration imparting time was adjusted by changing the transportation speed of the support, provided with the coating layer formed, of the magnetic layer forming composition.

In Table 5, in Comparative Examples in which "not performed" is disclosed in a column of the cooling zone staying time, a magnetic tape was manufactured by a manufacturing step not including a cooling zone.

In Table 5, in Comparative Examples in which "not performed" is disclosed in a column of the ultrasonic vibration imparting conditions, a magnetic tape was manufactured by a manufacturing step not including a vibration imparting part.

The thickness of each layer and the non-magnetic support of the magnetic tape manufactured was acquired by the following method. It was confirmed that the thickness of each layer and the non-magnetic support formed is the thickness shown in Table 5.

The cross section of the magnetic tape in a thickness direction was exposed by an ion beam, and then, the cross section observation of the exposed cross section was performed with a scanning electron microscope. Various thicknesses were acquired as an arithmetical mean of thicknesses acquired at two positions in the thickness direction, in the cross section observation.

The following evaluations were performed regarding each magnetic tape of Examples 1 to 5 and Comparative Examples 1 to 11 manufactured as described above.

Physical Properties Evaluation Method of Magnetic Tape

1. Spacing Distributions $FWHM_{before}$ and $FWHM_{after}$ Before and after Vacuum Heating The spacing distributions $FWHM_{before}$ and $FWHM_{after}$ before and after vacuum heating were acquired by the following method by using a tape spacing analyzer (TSA) (manufactured by MicroPhysics, Inc.).

In a state where a glass sheet included in the TSA was disposed on the surface of the magnetic layer of the magnetic tape, a hemisphere was pressed against the surface of the back coating layer of the magnetic tape at pressure of $5.05 \times 10^4$ N/m (0.5 atm) by using a hemisphere made of urethane included in the TSA as a pressing member. In this state, a given region (150,000 to 200,000 µm$^2$) of the surface of the magnetic layer of the magnetic tape was irradiated with white light from a stroboscope included in the TSA through the glass sheet, and the obtained reflected light was received by a charge-coupled device (CCD) through an interference filter (filter selectively passing light at a wavelength of 633 nm), and thus, an interference fringe image generated on the uneven part of the region was obtained.

This image was divided into 300,000 points, a distance (spacing) between the surface of the glass sheet on the magnetic tape side and the surface of the magnetic layer of the magnetic tape was acquired, and the full width at half maximum of spacing distribution was full width at half maximum, when this spacing was shown with a histogram, and this histogram was fit with Gaussian distribution.

The vacuum heating was performed by storing the magnetic tape in a vacuum constant temperature drying machine with a degree of vacuum of 200 Pa to 0.01 Mpa and at inner atmosphere temperature of 70° C. to 90° C. for 24 hours.

2. Difference ($S_{after} - S_{before}$)

The difference ($S_{after} - S_{before}$) was a value obtained by subtracting a mode of the histogram before the vacuum heating from a mode of the histogram after the vacuum heating obtained in the section 1.

3. Surface Part C—H Derived C Concentration

The X-ray photoelectron spectroscopic analysis was performed regarding the surface of the magnetic layer of the magnetic tape (measurement region: 300 μm×700 μm) by the following method using an ESCA device, and a surface part C—H derived C concentration was calculated from the analysis result.

Analysis and Calculation Method

All of the measurement (1) to (3) described below were performed under the measurement conditions shown in Table 1.

TABLE 1

| Device | AXIS-ULTRA manufactured by Shimadzu Corporation |
|---|---|
| Excitation X-ray source | Monochromatic Al-Kα ray (output: 15 kV, 20 mA) |
| Analyzer mode | Spectrum |
| Lens mode | Hybrid (analysis area: 300 μm × 700 μm) |
| Neutralization electron gun for charge correction (Charge neutraliser) | ON (used) |
| Photoelectron take-off angle (take-off angle) | 10 deg. (angle formed by a detector and a sample surface) |

(1) Wide Scan Measurement

A wide scan measurement (measurement conditions: see Table 2) was performed regarding the surface of the magnetic layer of the magnetic tape with the ESCA device, and the types of the detected elements were researched (qualitative analysis).

TABLE 2

| Scan range | Pass Energy | Energy resolution (Step) | Capturing time (Dwell) | Number of integration times (Sweeps) |
|---|---|---|---|---|
| 0 to 1200 eV | 160 eV | 1 eV/step | 100 ms/step | 5 |

(2) Narrow Scan Measurement

All elements detected in (1) described above were subjected to narrow scan measurement (measurement conditions: see Table 3). An atom concentration (unit: atom %) of each element detected was calculated from a peak surface area of each element by using software for a data process attached to the device (Vision 2.2.6). Here, the C concentration was also calculated.

TABLE 3

| Spectra[Note 1] | Scan range | Pass Energy | Energy resolution (Step) | Capturing time (Dwell) | Number of integration times (Sweeps)[Note 2] |
|---|---|---|---|---|---|
| C1s | 276 to 296 eV | 80 eV | 0.1 eV/step | 100 ms/step | 3 |
| Cl2p | 190 to 212 eV | 80 eV | 0.1 eV/step | 100 ms/step | 5 |
| N1s | 390 to 410 eV | 80 eV | 0.1 eV/step | 100 ms/step | 5 |
| O1s | 521 to 541 eV | 80 eV | 0.1 eV/step | 100 ms/step | 3 |
| Fe2p | 700 to 740 eV | 80 eV | 0.1 eV/step | 100 ms/step | 3 |
| Ba3d | 765 to 815 eV | 80 eV | 0.1 eV/step | 100 ms/step | 3 |
| Al2p | 64 to 84 eV | 80 eV | 0.1 eV/step | 100 ms/step | 5 |
| Y3d | 148 to 168 eV | 80 eV | 0.1 eV/step | 100 ms/step | 3 |
| P2p | 120 to 140 eV | 80 eV | 0.1 eV/step | 100 ms/step | 5 |
| Zr3d | 171 to 191 eV | 80 eV | 0.1 eV/step | 100 ms/step | 5 |
| Bi4f | 151 to 171 eV | 80 eV | 0.1 eV/step | 100 ms/step | 3 |
| Sn3d | 477 to 502 eV | 80 eV | 0.1 eV/step | 100 ms/step | 5 |
| Si2p | 90 to 110 eV | 80 eV | 0.1 eV/step | 100 ms/step | 5 |
| S2p | 153 to 173 eV | 80 eV | 0.1 eV/step | 100 ms/step | 5 |

[Note 1] Spectra shown in Table 3 (element type) are examples, and in a case where an element not shown in Table 3 is detected by the qualitative analysis of the section (1), the same narrow scan measurement is performed in a scan range including entirety of spectra of the elements detected.
[Note 2] The spectra having excellent signal-to-noise ratio (S/N ratio) were measured when the number of integration times is set as three times. However, even when the number of integration times regarding the entirety of spectra is set as five times, the quantitative results are not affected.

The C1s spectra were acquired under the measurement conditions disclosed in Table 4. Regarding the acquired C1s spectra, after correcting a shift (physical shift) due to a sample charge by using software for a data process attached to the device (Vision 2.2.6), a fitting process (peak resolution) of the C1s spectra was performed by using the software described above. In the peak resolution, the fitting of C1s spectra was performed by a nonlinear least-squares method using a Gauss-Lorentz complex function (Gaussian component: 70%, Lorentz component: 30%), and a percentage (peak area ratio) of the C—H peak occupying the C1s spectra was calculated. A C—H derived C concentration was calculated by multiplying the calculated C—H peak area ratio by the C concentration acquired in (2) described above.

(3) Acquiring of C1s Spectra

TABLE 4

| Spectra | Scan range | Pass Energy | Energy resolution (Step) | Capturing time (Dwell) | Number of integration times (Sweeps) |
|---|---|---|---|---|---|
| C1s | 276 to 296 eV | 10 eV | 0.1 eV/step | 200 ms/step | 20 |

An arithmetical mean of values obtained by performing the above-mentioned process at different positions of the surface of the magnetic layer of the magnetic tape three times was set as the surface part C—H derived C concentration.

Performance Evaluation Method of Magnetic Tape

Number of Times of Occurrence of Sticking

A magnetic head (hereinafter, referred to as a "head") extracted from a drive of Linear Tape-Open Generation 6 (LTO (registered trademark) G6) manufactured by IBM was installed into a tape running system attached with a strain gauge.

At the time of running of the tape running system, the region on the magnetic tape can be widely divided into three regions of a region (acceleration region) from a sending roll to a portion away from the sending roll by 5 m, a region (deceleration region) from a winding roll to a portion away from the winding roll by 5 m, and a high-speed region between the acceleration region and the deceleration region. The running speed of the magnetic tape is lower than the set speed in the acceleration region and the deceleration region, whereas the magnetic tape substantially runs at the set speed in the high-speed region. The set speed was set as 10 m/sec.

In the environment of an atmosphere temperature of 40° C.±1° C. and relative humidity of 80%, in the tape running system, the magnetic tape having a tape length of 50 m was subjected to reciprocating running of 10,000 cycles by a method of sending the magnetic tape from the sending roll while applying a tension of 0.6 N and winding the magnetic tape around the winding roll. During the repeated running, the head was constantly brought to come into contact with the surface of the magnetic layer to monitor a voltage value obtained during the repeated running by a strain gauge attached to the head, and it was determined that sticking occurs when a load converted from the monitored voltage value exceeds 1.5 N, and the number of times of occurrence of the sticking in the acceleration region and the high-speed region was acquired.

The environment described above is an environment generally called a high humidity environment in which the relative humidity is 80%, therefore, the sticking tends to occur more easily due to the effect of moisture, compared to a low humidity environment in which the relative humidity is low. In such an environment, when the number of times of occurrence of the sticking evaluated under the conditions described above is equal to or smaller than 5 times respectively in the acceleration region and the high-speed region, the magnetic tape can be evaluated as a magnetic tape exhibiting a performance to deal with the future needs regarding the running stability.

The results described above are shown in Table 5.

TABLE 5

| | | | Unit | Comparative Example 1 | Comparative Example 2 | Comparative Example 3 | Comparative Example 4 | Comparative Example 5 | Comparative Example 6 |
|---|---|---|---|---|---|---|---|---|---|
| Non-magnetic layer forming composition | Butyl stearate | Content | Part | 4.0 | 4.0 | 4.0 | 4.0 | 8.0 | 4.0 |
| | Stearic acid | Content | Part | 2.0 | 2.0 | 2.0 | 2.0 | 2.0 | 6.0 |
| Manufacturing conditions | Ultrasonic vibration imparting conditions | Imparting time | Second | None | None | None | None | None | None |
| | | Frequency Intensity | kHz W | | | | | | |
| | Magnetic layer forming composition preparation conditions | Number of times of passes of flow-type ultrasonic dispersion device | Times | 2 | 2 | 2 | 2 | 2 | 2 |
| | | Number of times of filtering | Times | 1 | 1 | 1 | 1 | 1 | 1 |
| | | Filter hole diameter | μm | 1.0 | 1.0 | 1.0 | 1.0 | 1.0 | 1.0 |
| | Cooling zone | Staying time | Second | Not performed | Not performed | Not performed | Not performed | Not performed | Not performed |
| Physical properties | Magnetic layer | Thickness | μm | 0.10 | 0.10 | 0.10 | 0.10 | 0.10 | 0.10 |
| | Non-magnetic layer | Thickness | μm | 1.00 | 0.70 | 0.50 | 0.10 | 0.50 | 0.50 |
| | Non-magnetic support | Thickness | μm | 4.30 | 4.30 | 4.30 | 4.30 | 4.30 | 4.30 |
| | Back coating layer | Thickness | μm | 0.60 | 0.60 | 0.60 | 0.60 | 0.60 | 0.60 |
| | Non-magnetic layer + magnetic layer | Total thickness | μm | 1.10 | 0.80 | 0.60 | 0.20 | 0.60 | 0.60 |
| | Safter-Sbefore | | nm | 6.0 | 4.2 | 3.2 | 1.0 | 6.0 | 3.2 |
| | FWHMbefore | | nm | 8.7 | 8.8 | 8.5 | 8.6 | 8.6 | 8.6 |
| | FWHMafter | | nm | 6.9 | 6.8 | 7.0 | 7.0 | 6.8 | 6.8 |
| | C—H derived C concentration | | Atom % | 35 | 35 | 35 | 35 | 35 | 38 |
| Performance | Number of times of occurrence of sticking | High-speed region | Times | 0 | 1 | 15 | 30* | 13 | 14 |
| | | Acceleration region | Times | 0 | 2 | 30 | Unevaluable | 32 | 28 |

| | | | Unit | Comparative Example 7 | Comparative Example 8 | Comparative Example 9 | Comparative Example 10 | Comparative Example 11 | Example 1 |
|---|---|---|---|---|---|---|---|---|---|
| Non-magnetic layer forming composition | Butyl stearate | Content | Part | 4.0 | 4.0 | 4.0 | 10.0 | 0.0 | 4.0 |
| | Stearic acid | Content | Part | 2.0 | 2.0 | 2.0 | 2.0 | 2.0 | 2.0 |
| Manufacturing conditions | Ultrasonic vibration imparting | Imparting time | Second | 0.5 | 0.5 | None | 0.5 | 0.5 | 0.5 |
| | | Frequency | kHz W | 30 | 30 | | 30 | 30 | 30 |

TABLE 5-continued

| | | | | | | | | | |
|---|---|---|---|---|---|---|---|---|---|
| | conditions | Intensity | | 100 | 100 | 100 | 100 | 100 | 100 |
| | Magnetic layer forming composition preparation conditions | Number of times of passes of flow-type ultrasonic dispersion device | Times | 2 | 1 | 2 | 2 | 2 | 2 |
| | | Number of times of filtering | Times | 1 | 1 | 1 | 1 | 1 | 1 |
| | | Filter hole diameter | μm | 1.0 | 1.0 | 1.0 | 1.0 | 1.0 | 1.0 |
| | Cooling zone | Staying time | Second | Not performed | 5.0 | 5.0 | 5.0 | 5.0 | 5.0 |
| Physical properties | Magnetic layer | Thickness | μm | 0.10 | 0.10 | 0.10 | 0.10 | 0.10 | 0.10 |
| | Non-magnetic layer | Thickness | μm | 0.50 | 0.50 | 0.50 | 0.50 | 0.50 | 0.50 |
| | Non-magnetic support | Thickness | μm | 4.30 | 4.30 | 4.30 | 4.30 | 4.30 | 4.30 |
| | Back coating layer | Thickness | μm | 0.60 | 0.60 | 0.60 | 0.60 | 0.60 | 0.60 |
| | Non-magnetic layer + magnetic layer | Total thickness | μm | 0.60 | 0.60 | 0.60 | 0.60 | 0.60 | 0.60 |
| | | Safter-Sbefore | nm | 3.2 | 3.2 | 3.2 | 8.2 | 0 | 3.1 |
| | | FWHMbefore | nm | 6.8 | 6.7 | 8.6 | 6.7 | 6.7 | 6.8 |
| | | FWHMafter | nm | 6.8 | 7.5 | 6.8 | 6.7 | 6.8 | 6.9 |
| | | C—H derived C concentration | Atom % | 35 | 55 | 55 | 55 | 55 | 55 |
| Performance | Number of times of occurrence of sticking | High-speed region | Times | 4 | 14 | 10 | 10* | Unevaluable | 3 |
| | | Acceleration region | Times | 25 | 30 | 3 | Unevaluable | 2* | 4 |

| | | | | Unit | Example 2 | Example 3 | Example 4 | Example 5 |
|---|---|---|---|---|---|---|---|---|
| | | Non-magnetic layer forming composition | Butyl stearate | Content | Part | 4.0 | 2.0 | 8.0 | 4.0 |
| | | | Stearic acid | Content | Part | 2.0 | 1.0 | 6.0 | 2.0 |
| | | Manufacturing conditions | Ultrasonic vibration imparting conditions | Imparting time | Second | 3.0 | 0.5 | 0.5 | 3.0 |
| | | | | Frequency | kHz | 30 | 30 | 30 | 30 |
| | | | | Intensity | W | 100 | 100 | 100 | 100 |
| | | | Magnetic layer forming composition preparation conditions | Number of times of passes of flow-type ultrasonic dispersion device | Times | 30 | 2 | 2 | 30 |
| | | | | Number of times of filtering | Times | 5 | 1 | 1 | 5 |
| | | | | Filter hole diameter | μm | 0.5 | 1.0 | 1.0 | 0.5 |
| | | | Cooling zone | Staying time | Second | 180.0 | 5.0 | 5.0 | 180.0 |
| | | Physical properties | Magnetic layer | Thickness | μm | 0.10 | 0.10 | 0.10 | 0.10 |
| | | | Non-magnetic layer | Thickness | μm | 0.50 | 0.50 | 0.50 | 0.10 |
| | | | Non-magnetic support | Thickness | μm | 4.30 | 4.30 | 4.30 | 4.30 |
| | | | Back coating layer | Thickness | μm | 0.60 | 0.60 | 0.60 | 0.60 |
| | | | Non-magnetic layer + magnetic layer | Total thickness | μm | 0.60 | 0.60 | 0.60 | 0.20 |
| | | | | Safter-Sbefore | nm | 2.9 | 1.5 | 6.2 | 3.1 |
| | | | | FWHMbefore | nm | 4.1 | 7.0 | 4.1 | 3.9 |
| | | | | FWHMafter | nm | 4.0 | 6.9 | 6.9 | 4.0 |
| | | | | C—H derived C concentration | Atom % | 70 | 50 | 58 | 65 |
| | | Performance | Number of times of occurrence of sticking | High-speed region | Times | 0 | 4 | 1 | 3 |
| | | | | Acceleration region | Times | 0 | 5 | 3 | 2 |

*the number of times of occurrence of the sticking until the running stops

With the comparison of Comparative Examples shown in Table 5, it was confirmed that, in a case where the total thickness of the non-magnetic layer and the magnetic layer is equal to or smaller than 0.60 μm (Comparative Examples 3 to 10), the sticking significantly occurs in the high-speed region and/or the acceleration region, compared to the case where the total thickness of the non-magnetic layer and the magnetic layer exceeds 0.60 μm (Comparative Examples 1 and 2).

In the evaluation of the magnetic tape of Comparative Example 11, the magnetic tape could not be run and was stopped in the high-speed region due to the effect of the cut scrap caused by the cutting of the surface of the magnetic layer due to the contact with the head. Accordingly, regarding the magnetic tape of Comparative Example 11, the number of times of occurrence of the sticking in the high-speed region may not be evaluated. Regarding the magnetic tape in Comparative Example 11, Table 5 showed the number of times of occurrence of the sticking in the acceleration region until the running had stopped due to the effect of cut scrap.

Meanwhile, in the evaluation of the magnetic tapes in Comparative Examples 4 and 10, the running of the magnetic tape was stopped due to the sticking between the surface of the magnetic layer and the head in the acceleration region, and thus, the number of times of occurrence of the sticking in the acceleration region could not be evaluated. Regarding the magnetic tapes of Comparative Examples 4 and 10, Table 5 showed the number of times of occurrence of the sticking in the high-speed region until the running had stopped.

In contrast, in the magnetic tapes of Examples 1 to 5, the number of times of occurrence of the sticking was low in both regions of the high-speed region and the acceleration region or sticking did not occur, and excellent running stability was exhibited.

An aspect of the invention can be effective in the technical fields of magnetic tapes such as back-up tapes.

What is claimed is:

1. A magnetic tape comprising:
   a non-magnetic support;
   a non-magnetic layer including non-magnetic powder and a binder on the non-magnetic support; and
   a magnetic layer including ferromagnetic powder and a binder on the non-magnetic layer,
   wherein the total thickness of the non-magnetic layer and the magnetic layer is equal to or smaller than 0.60 μm,
   the magnetic layer includes one or more components selected from the group consisting of fatty acid and fatty acid amide, and fatty acid ester,
   a C—H derived C concentration calculated from a C—H peak area ratio of C1s spectra obtained by X-ray photoelectron spectroscopic analysis performed on the surface of the magnetic layer at a photoelectron take-off angle of 10 degrees, is equal to or greater than 45 atom %,
   a full width at half maximum of spacing distribution measured by optical interferometry regarding the surface of the magnetic layer before performing vacuum heating with respect to the magnetic tape, is greater than 0 nm and equal to or smaller than 7.0 nm,
   a full width at half maximum of spacing distribution measured by optical interferometry regarding the surface of the magnetic layer after performing the vacuum heating with respect to the magnetic tape, is greater than 0 nm and equal to or smaller than 7.0 nm, and
   a difference $S_{after}-S_{before}$ between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape, is greater than 0 nm and equal to or smaller than 8.0 nm.

2. The magnetic tape according to claim 1,
   wherein the C—H derived C concentration is in a range of 45 to 80 atom %.

3. The magnetic tape according to claim 1,
   wherein the C—H derived C concentration is in a range of 60 to 80 atom %.

4. The magnetic tape according to claim 1,
   wherein the difference $S_{after}-S_{before}$ is greater than 0 nm and equal to or smaller than 7.0 nm.

5. The magnetic tape according to claim 1,
   wherein the difference $S_{after}-S_{before}$ is 2.0 nm to 7.0 nm.

6. The magnetic tape according to claim 1,
   wherein the full width at half maximum of spacing distribution measured by optical interferometry regarding the surface of the magnetic layer before performing vacuum heating with respect to the magnetic tape, is greater than 0 nm and equal to or smaller than 5.0 nm.

7. The magnetic tape according to claim 1,
   wherein the full width at half maximum of spacing distribution measured by optical interferometry regarding the surface of the magnetic layer after performing the vacuum heating with respect to the magnetic tape, is greater than 0 nm and equal to or smaller than 5.0 nm.

8. The magnetic tape according to claim 2,
   wherein the difference $S_{after}-S_{before}$ is greater than 0 nm and equal to or smaller than 7.0 nm.

9. The magnetic tape according to claim 2,
   wherein the difference $S_{after}-S_{before}$ is 2.0 nm to 7.0 nm.

10. The magnetic tape according to claim 2,
    wherein the full width at half maximum of spacing distribution measured by optical interferometry regarding the surface of the magnetic layer before performing vacuum heating with respect to the magnetic tape, is greater than 0 nm and equal to or smaller than 5.0 nm.

11. The magnetic tape according to claim 2,
    wherein the full width at half maximum of spacing distribution measured by optical interferometry regarding the surface of the magnetic layer after performing the vacuum heating with respect to the magnetic tape, is greater than 0 nm and equal to or smaller than 5.0 nm.

12. The magnetic tape according to claim 3,
    wherein the difference $S_{after}-S_{before}$ is greater than 0 nm and equal to or smaller than 7.0 nm.

13. The magnetic tape according to claim 3,
    wherein the difference $S_{after}-S_{before}$ is 2.0 nm to 7.0 nm.

14. The magnetic tape according to claim 3,
    wherein the full width at half maximum of spacing distribution measured by optical interferometry regarding the surface of the magnetic layer before performing vacuum heating with respect to the magnetic tape, is greater than 0 nm and equal to or smaller than 5.0 nm.

15. The magnetic tape according to claim 3,
    wherein the full width at half maximum of spacing distribution measured by optical interferometry regarding the surface of the magnetic layer after performing the vacuum heating with respect to the magnetic tape, is greater than 0 nm and equal to or smaller than 5.0 nm.

16. The magnetic tape according to claim 1,
wherein the total thickness of the non-magnetic layer and the magnetic layer is 0.20 μm to 0.60 μm.

17. The magnetic tape according to claim 1,
wherein the magnetic layer includes a non-magnetic filler.

18. The magnetic tape according to claim 9,
wherein the non-magnetic filler is colloidal particles.

19. The magnetic tape according to claim 10,
wherein the non-magnetic filler is colloidal particles.

* * * * *